United States Patent
Venkatachalam et al.

(10) Patent No.: US 8,462,040 B2
(45) Date of Patent: Jun. 11, 2013

(54) RESOLUTION ENHANCEMENT SYSTEM (RES) FOR NETWORKED RADARS

(75) Inventors: Chandrasekaran Venkatachalam, Fort Collins, CO (US); Nitin Bharadwaj, Richland, WA (US)

(73) Assignee: Colorado State University Research Foundation, Fort Collins, CO (US)

( * ) Notice: Subject to any disclaimer, the term of this patent is extended or adjusted under 35 U.S.C. 154(b) by 285 days.

(21) Appl. No.: 12/908,599

(22) Filed: Oct. 20, 2010

(65) Prior Publication Data

US 2011/0102249 A1      May 5, 2011

Related U.S. Application Data

(60) Provisional application No. 61/253,371, filed on Oct. 20, 2009, provisional application No. 61/253,407, filed on Oct. 20, 2009.

(51) Int. Cl.
*G01S 13/00* (2006.01)

(52) U.S. Cl.
USPC .......................................... 342/26 R; 342/59

(58) Field of Classification Search
USPC .................................. 342/26 R, 59
See application file for complete search history.

(56) References Cited

U.S. PATENT DOCUMENTS

| | | | |
|---|---|---|---|
| 5,465,413 A | 11/1995 | Enge et al. | |
| 5,583,512 A | 12/1996 | Mceligot | |
| 6,377,204 B1 | 4/2002 | Wurman et al. | |
| 6,522,456 B2 | 2/2003 | Chen et al. | |
| 7,103,026 B2 | 9/2006 | Hall et al. | |
| 7,248,207 B2 | 7/2007 | Ohnishi | |
| 7,518,544 B2* | 4/2009 | Venkatachalam et al. | 342/59 |
| 7,733,264 B1* | 6/2010 | Woodell et al. | 342/26 B |
| 2004/0264977 A1 | 12/2004 | Yap et al. | |
| 2006/0187114 A1 | 8/2006 | Gibson et al. | |
| 2006/0273952 A1 | 12/2006 | Krikorian et al. | |
| 2006/0290561 A1* | 12/2006 | Praskovsky et al. | 342/26 D |
| 2007/0046526 A1 | 3/2007 | O'Hora et al. | |
| 2007/0229347 A1 | 10/2007 | Holmberg | |
| 2008/0059098 A1 | 3/2008 | Zhang | |
| 2009/0237292 A1 | 9/2009 | Tigrek et al. | |
| 2009/0289836 A1 | 11/2009 | Frank et al. | |
| 2011/0102250 A1 | 5/2011 | Venkatachalam et al. | |

OTHER PUBLICATIONS

Ackroyd, M. et al., Optimum mismatched filters for sidelobe suppression. Aerospace and Electronic System, *IEEE Transaction on AES*,1973, pp. 9, 214-218.

Hansen, P. C., 1992: Analysis of discrete ill-posed problems by means of the L-Curve. SIAM Review, 34, pp. 561-580.

(Continued)

*Primary Examiner* — Timothy A Brainard
(74) *Attorney, Agent, or Firm* — Kilpatrick, Townsend & Stockton LLP

(57) ABSTRACT

Embodiments provide methods, systems, and/or devices that can provide measurements of the inherent reflectivity distribution from different look angles using N radar nodes. Doppler weather radars generally operate with very good spatial resolution in range and poor cross range resolution at farther ranges. Embodiments provide methodologies to retrieve higher resolution reflectivity data from a network of radars. In a networked radar environment, each radar may observe a common reflectivity distribution with different spreading function. The principle that the underlying reflectivity distribution should remain identical for all the nodes may be used to solve the inverse problem to determine intrinsic reflectivities.

28 Claims, 31 Drawing Sheets

OTHER PUBLICATIONS

Mudukutore, A. S., et al., Pulse compression for weather radars, IEEE Transaction on Geoscience and Remote Sensing, 1998, vol. 36, No. 1, pp. 125-142.

Petersen, D. P. et al., Sampling and reconstruction of wave-number limited functions in N-dimensional euclidean spaces. information and Control, 1962, 5, 279-323.

International Search Report and Written Opinion of PCT/US2010/053424 mailed on Dec. 21, 2010, 9 pages.

International Search Report and Written Opinion of PCT/US2010/053394 mailed on Dec. 10, 2010, 8 pages.

* cited by examiner

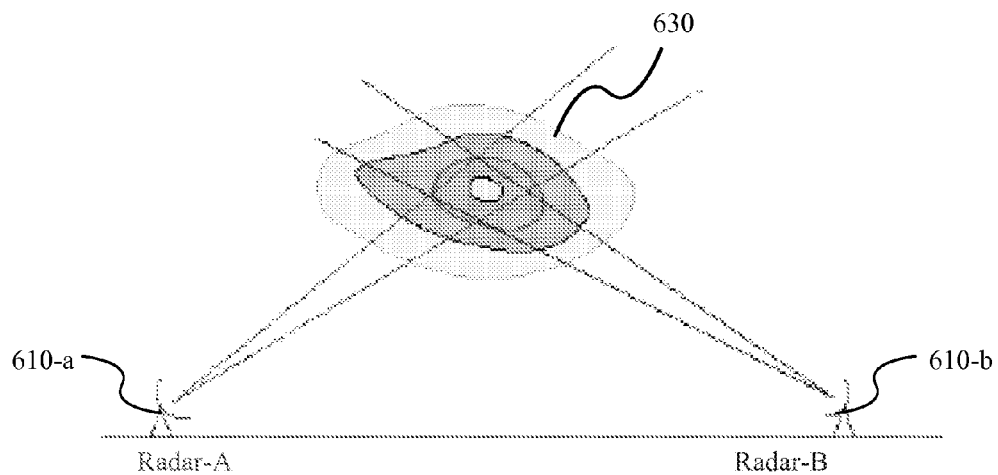
FIG. 6-a
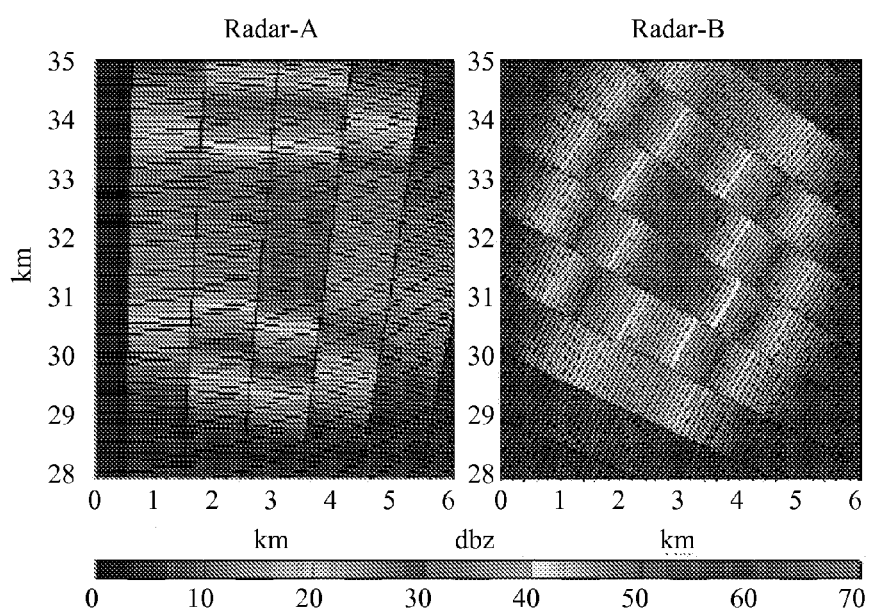
FIG. 6-b

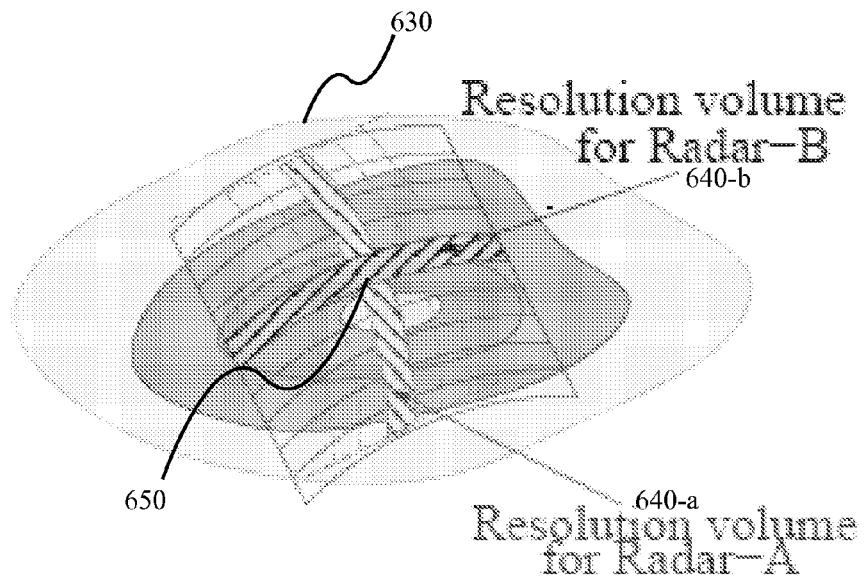
FIG. 6-c
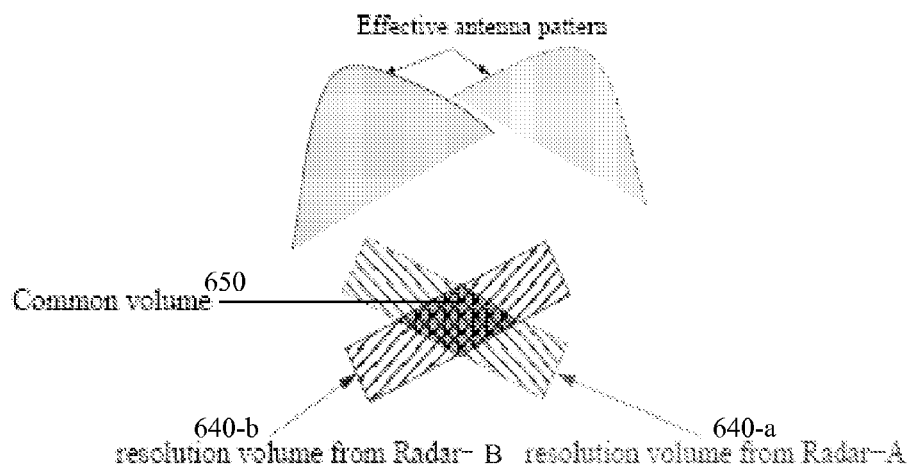
FIG. 6-d

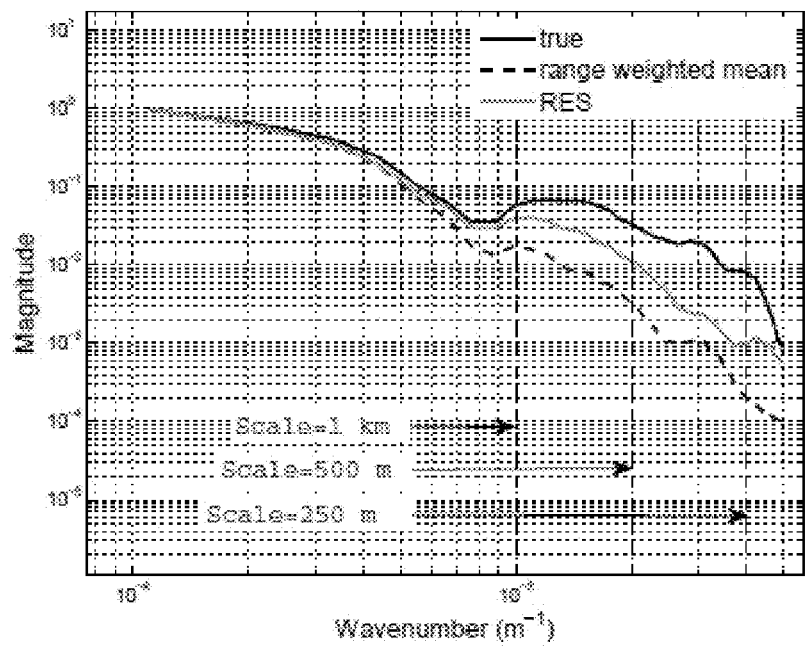
(a)
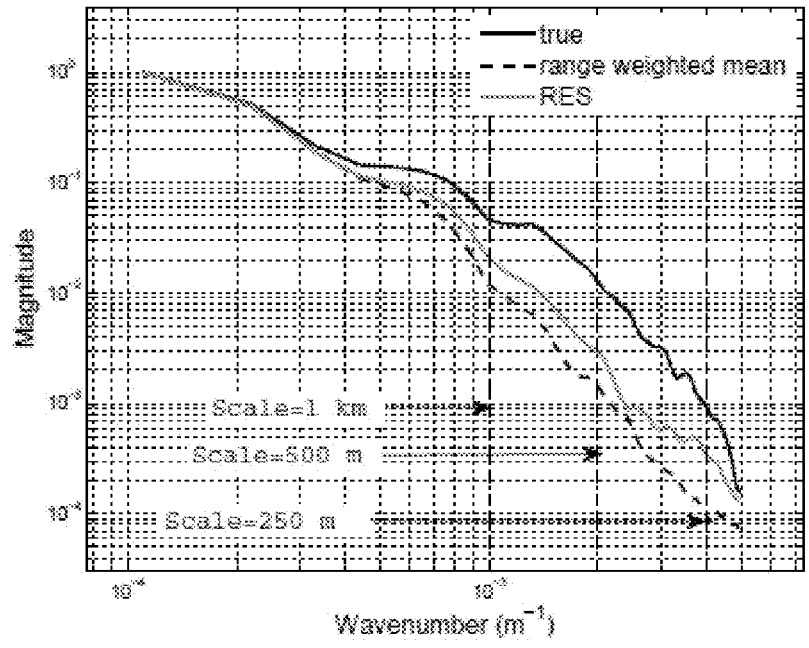
(b)
FIGS. 18

RESOLUTION ENHANCEMENT SYSTEM (RES) FOR NETWORKED RADARS

CROSS-REFERENCES TO RELATED APPLICATIONS

This application is a nonprovisional of, and claims the benefit of, U.S. Provisional Patent Application Ser. No. 61/253,371, entitled "RESOLUTION ENHANCEMENT SYSTEM (RES) FOR NETWORKED RADARS," filed Oct. 20, 2009 and U.S. Provisional Patent Application Ser. No. 61/253,407, entitled "SENSITIVITY ENHANCEMENT SYSTEM," filed Oct. 20, 2009, the entire disclosures of which are incorporated herein by reference for all purposes.

STATEMENT AS TO RIGHTS TO INVENTIONS MADE UNDER FEDERALLY SPONSORED RESEARCH OR DEVELOPMENT

This invention was made with Government support under National Science Foundation Award Number 0313747. The government has certain rights in the invention.

BACKGROUND

The resolution of Doppler weather radars is primarily dependent on the transmit pulse length and antenna beam width. The resolution has two independent components, namely, range resolution and cross-range resolution. Range resolution generally corresponds to the pulse length, while cross-range resolution is generally a function of beam width and the range to the resolution volume. Obtaining good range resolution for Doppler weather radars has not been a very serious problem because a short transmit pulse provides very good range resolution. However, obtaining good cross-range resolution at farther ranges may require the use of larger antenna, which may not be a viable solution. There is thus a need for methods, systems, and devices for the retrieval of radar reflectivity at high resolution for volume targets.

BRIEF SUMMARY

Embodiments provide methods, systems, and/or devices that may use measurements from a network of radar nodes to retrieve reflectivity fields with better resolution than what is possible with individual radar nodes. Embodiments may be used to determine intrinsic reflectivities for precipitation systems with volume targets that extend over a large area. In a networked radar environment, each radar may observe a common reflectivity distribution with a different spreading function. The principle that the underlying reflectivity distribution should remain identical for all the nodes may be used to solve an inverse problem described below.

Embodiments may include numerous different advantages. For example, retrieved reflectivity may have enhanced resolution compared to individual radar observations with respect to cross-azimuthal resolution. Embodiments may be able to utilize lower cost radars with relatively smaller apertures in a network and still retrieve reflectivity at an acceptable resolution. The retrieved reflectivity over the network coverage region may have nearly uniform resolution as opposed to reflectivity measurements with varying resolution that may be obtained from single radar.

Embodiments may be implemented on demand in a small selected region, thereby making it suitable for targeted applications. Embodiments may be designed so that they may be implemented with parallel processing. Parallel processing may reduce the time required for processing large areas of coverage and may make the system suitable for real-time applications.

Some embodiments may include a method for operating a radar network. The method may be utilized as part of a resolution enhancement system. The method may include generating multiple radar beams with each of multiple radars. The radars are disposed at different positions within the environment. The radars may utilize different frequencies. In one embodiment, two or more the respective radars may operate at different frequencies. In another embodiment, at least one of the radars has an X-band frequency.

The method may include determining multiple respective measured reflectivities of the environment along each respective path of each of the respective radar beams. Each of the respective measured reflectivities has a respective cross-azimuthal resolution. In some embodiments, the method may include correcting for attenuation along at least a portion of the respective path of at least one of the respective radar beams. In some embodiments, attenuation correction for each of the measured reflectivities may be performed.

The method may include determining multiple intrinsic reflectivities for multiple volume elements within the environment from the multiple respective measured reflectivities along the respective path of each of the respective radar beams. The respective intrinsic reflectivities for the respective volume elements each has a respective resolution greater than the respective cross-azimuthal resolutions of the measured reflectivities. In some embodiments, determining the intrinsic reflectivities may include utilizing a spreading function for each of the multiple radars. The spreading functions may be position variant. In some embodiments, determining the intrinsic reflectivities may include solving a minimization problem as described above. For example, the minimization problem may be represented as $\min\|G_n z_{vec} - z_{gm}\|_2^2$, where $$G_n = \sum_{j=1}^{N} G_j^T G_j$$

represents a networked radar transformation matrix, $$z_{gm} = \sum_{j=1}^{N} G_j^T z_{m(j)}$$

represents a network transformed measured reflectivity, $G_j$ represents the spreading function for a jth radar, N equals the number of radars in the plurality of radars, $z_m(j) = G(j) z_{vec}$ represents a vector of the plurality of measured reflectivities for the jth radar that correspond to $z_{vec}$ that represents a vectorized intrinsic reflectivity matrix.

In some embodiments, the method may utilize different grids for sampling the multiple intrinsic reflectivities for the multiple volume elements within the environment. For example, some embodiments may utilize a hexagonal grid. Some embodiments may utilize a Cartesian grid.

Some embodiments may include a networked-radar evaluation system. The networked-radar evaluation system may include a communications device, a storage device, a processor in communication with the communications device and with the storage device; and a memory coupled with the processor. The memory may include a computer-readable medium having a computer-readable program embodied therein for directing operation of the processing system to retrieve multiple intrinsic reflectivities from an environment. The computer-readable program may include instructions for receiving, with the communications device, a respective measured reflectivity of the environment along a respective path of each of multiple radar beams generated from respective ones of multiple radars disposed at different positions within the environment. Each respective measured reflectivity has a respective cross-azimuthal resolution. The computer-readable program may include instructions for determining, with the processor, the multiple intrinsic reflectivities for different volume elements within the environment from the respective measured reflectivity along the respective path of each of the plurality of radar beam. The respective intrinsic reflectivities for the respective volume elements each has a respective resolution greater than the respective cross-azimuthal resolutions of the measured reflectivities.

Some embodiments include a radar network. The radar network may include multiple radars disposed at different positions within an environment. The radar network may include a computational unit interfaced with the multiple radars. The computational unit may have instructions to determine multiple intrinsic reflectivities for multiple volume elements within the environment from multiple respective measured reflectivities along a respective path of each of multiple respective radar beams. Each respective measured reflectivity may have a respective cross-azimuthal resolution. The respective intrinsic reflectivities for the respective volume elements may each have a respective resolution greater than the respective cross-azimuthal resolutions of the measured reflectivities.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components. In some instances, reference labels include a numerical portion followed by a latin-letter suffix; reference to only the numerical portion of reference labels is intended to refer collectively to all reference labels that have that numerical portion but different latin-letter suffices.

FIG. 6-a illustrates a networked radar system for resolution enhancement in accordance with various embodiments; FIG. 6-b illustrates underlying reflectivity distribution being observed by two radar nodes in accordance with various embodiments; FIGS. 6-c and 6-d illustrate resolution volume with different cross-range resolution with higher resolution common volume in accordance with various embodiments.

FIGS. 18(a)-(b) illustrate isotropic power spectrum reflectivities distributions for (a) Case I and (b) Case II.

UTC (a) range weighted reflectivity mosaic and (b) RES reflectivity retrieval in accordance with various embodiments.

Figure 26:
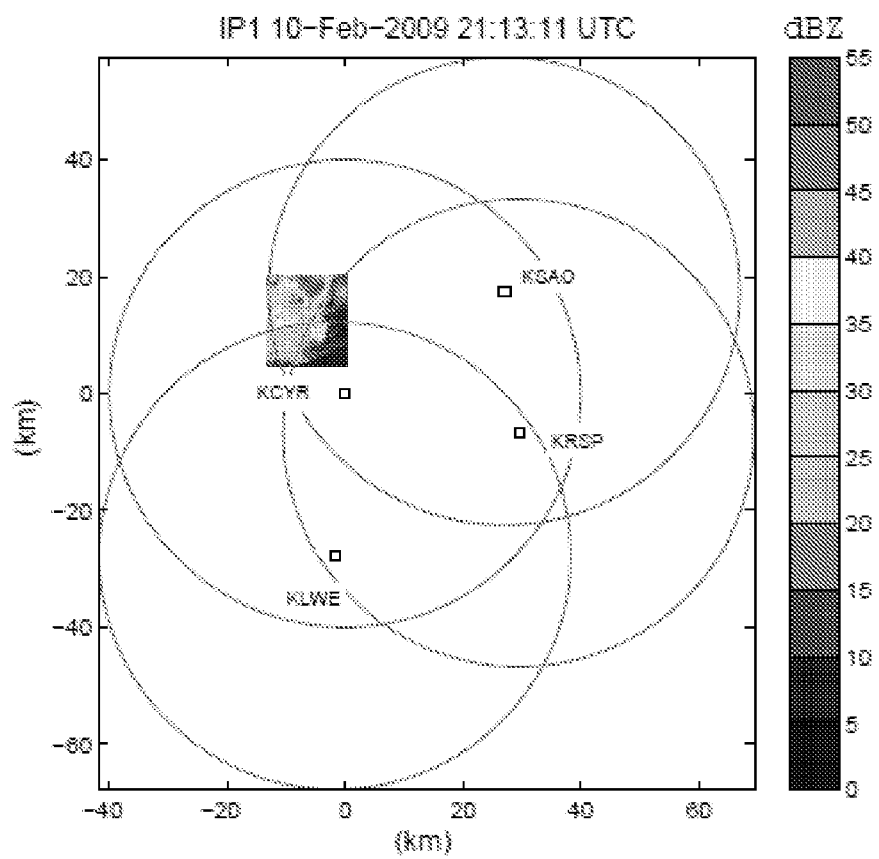

FIG. 26 illustrates the location of the precipitation event in the radar network for data collected with IP1 radar network on 2008 Feb. 10 at 21:13:11 UTC in accordance with various embodiments.

FIGS. 27(a)-(d) illustrate data collected from the IP1 radar network on 2009 Feb. 10 at 21:13:11 UTC (a) KCYR, (b) KSAO, (c) KLWE, and (d) KRSP in accordance with various embodiments.

FIGS. 28(a)-(b) illustrate reflectivity retrieval from the IP1 radar network with data collected on 2009 Feb. 10 at 21:13:11 UTC (a) range weighted reflectivity mosaic and (b) RES reflectivity retrieval in accordance with various embodiments.

Figure 29:
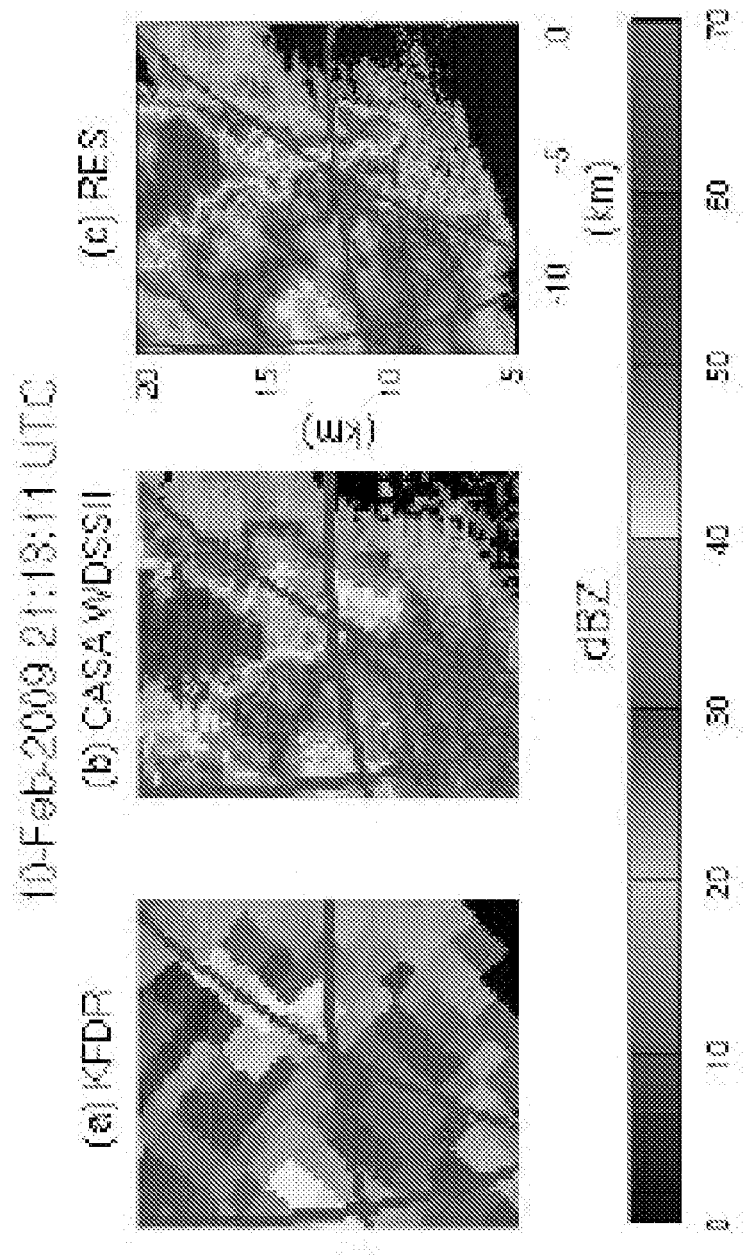

FIGS. 29 illustrate reflectivity from (a) KFDR, (b) reflectivity mosaic from WDSSII, and (c) RES reflectivity retrieval from data collected on 2009 Feb. 10 at 21:31:11 UTC in accordance with various embodiments.

Figure 30:
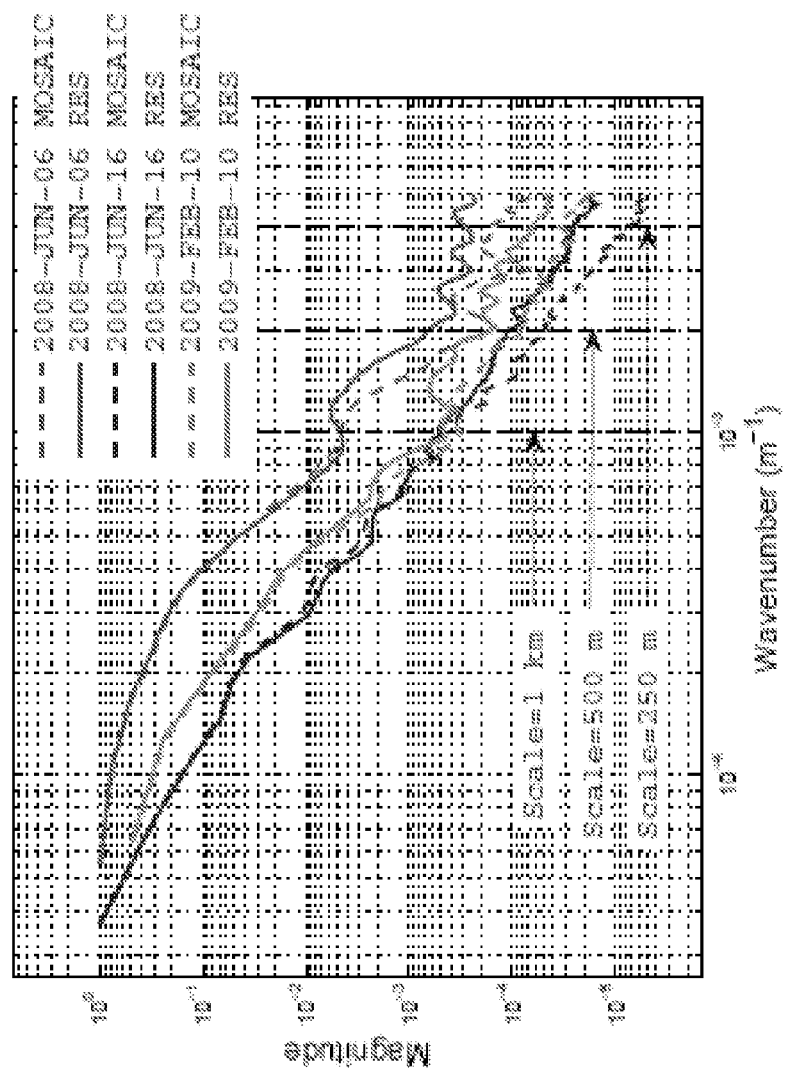

FIG. 30 illustrates a comparison of radially averaged power spectral density of the RES retrieval reflectivity and range weighted mosaic in accordance with various embodiments.

DETAILED DESCRIPTION

Embodiments provide methods, systems, and/or devices that can provide measurements of the inherent reflectivity distribution from different look angles using N radar nodes. Doppler weather radars operate with very good spatial resolution in range and poor cross range resolution at farther ranges. Embodiments provide methodologies to retrieve higher resolution reflectivity data from a network of radars. In a networked radar environment, each radar may observe a common reflectivity distribution with different spreading function. The principle that the underlying reflectivity distribution should remain identical for all the nodes may be used to solve the inverse problem described below.

Networked Radar Environments

Figure 1:
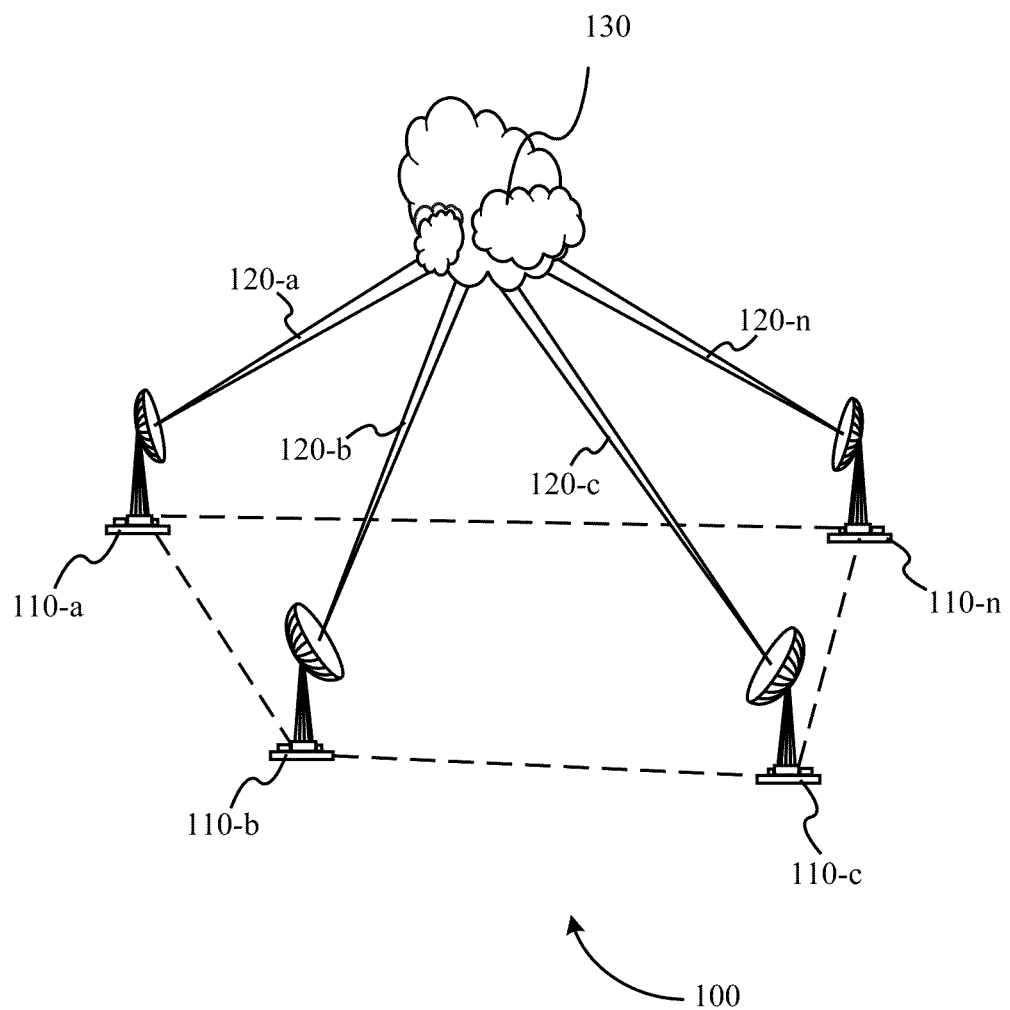
FIG. 1 illustrates a resolution enhancement system in accordance with various embodiments.

The basic structure of an embodiment of a resolution enhancement system 100 for networked radars is illustrated in FIG. 1. In this drawing, and in much of the discussion presented herein, the network radar system has multiple radars 110-a, 110-b, . . . , 110-n. System 100 shows four radars 110-a, 110-b, 110-c, and 110-n, for example. Illustrations using a specific number of radars are provided for exemplary purposes and are not intended to be limiting. It will be evident to those of skill in the art how to extend the methods and systems described herein to a system having an arbitrary number of radars.

System 100 shows that radars 110 may generate their own beams 120-a, 120-b, . . . , 120-n so that substantially simultaneous observations may be made of the same event in a resolution volume 130 by the different radars 110 in different geographical locations. For example, reflectivities may be measured breach of the radars 110 along the path of their respective beams 120. Measurements made by each of radars 110 may be expected to be different, because each radar 110 measures along the direction of its respective beam 120. Furthermore, measurement at a position in an environment may contain data that actually pertains to a different point along the path of a beam 120. The actual or intrinsic parameter, such as a reflectivity, will be the same for any given point or resolution volume in space, despite the measurements along separate beams 120 producing different values. A resolution enhancement system uses the principle that the underlying intrinsic parameters, such as reflectivity, of the environment remain consistent in a networked environment.

Figure 10:
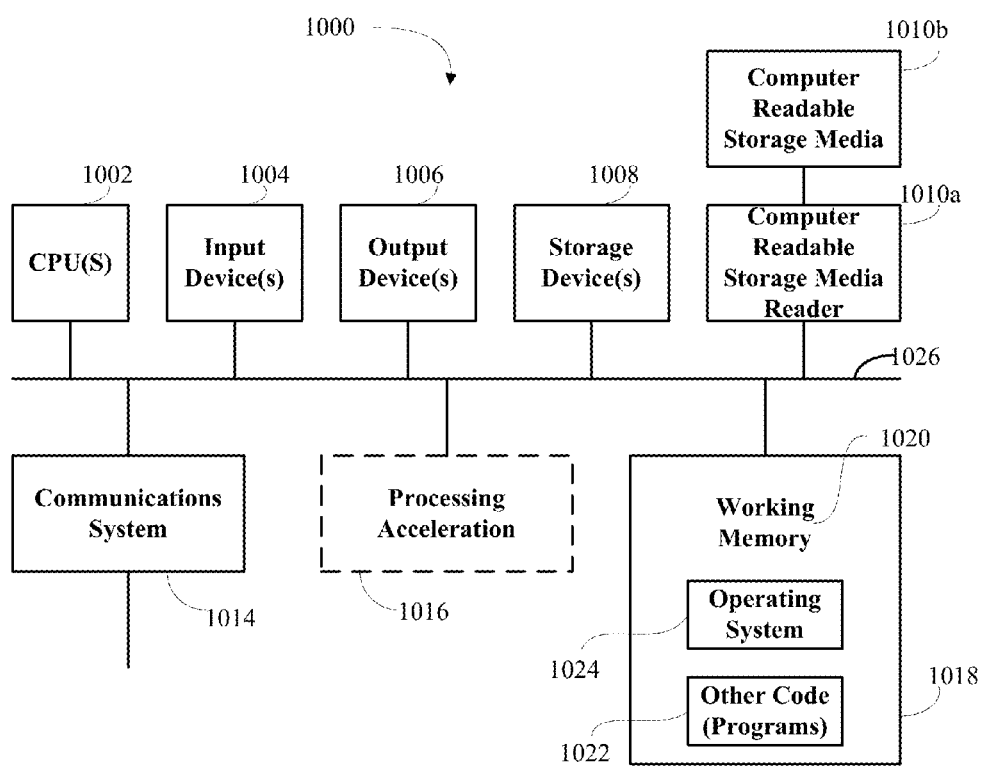
FIG. 10 provides a schematic illustration of a computational system in accordance with various embodiments.

Radars 110 may communicate with a computer system, such as that seen in FIG. 10, for example. Radars 110 may communicate data to the computer system, where the data may be processed. Radars 110 may receive instructions from the computer system. A computer system may be located remotely and/or off site from the radars in some embodiments. A computer system may be coupled with a radar 110. Radars 110 may communicate with each other in some embodiments. Radars 110 may be part of a networked radar system. In a networked radar environment, N radar nodes may work collaboratively. The N nodes together may be considered as one system making measurements of the atmosphere.

Radars 110 may be of many different types and operate at different frequencies in different embodiments. Radars 110 may include radars that cover different frequency bands including, but not limited to, the following: S-band radars operating at frequencies of 2-4 GHz, which correspond to wavelengths of about 9-15 cm; C-band radars operating at frequencies of 4-8 GHz, which correspond to wavelengths of about 4-8 cm; X-band radars operating with frequencies of 8-12 GHz, which correspond to wavelengths of about 2.5-4 cm; and K-band radars operating with frequencies of 12-40 GHZ, which correspond to wavelengths of about 0.75-2.5 cm. In some instances, each of the radars 110 may operate at substantially the same frequency, but this is not a requirement, and in other instances, different radars may operate at substantially different frequencies. In one exemplary embodiment, radars 110 may include all X-band radars.

Radars 110 may include monostatic radars, which may include both transmitter and receiver components. Some embodiments may include radars 110 that may have multiple transmitters and/or multiple receivers. In one embodiment, a radar 110 may include two transmitters, with one for horizontal polarization and one for vertical polarization, and two receivers, with one for horizontal polarization and one for vertical polarization. Some embodiments may include radars 110 with analog receivers. Some embodiments may include radars 110 with digital receivers. Some embodiments may include radars 110 that may include a receiver, but not a transmitter. Some embodiments may include radars 110 that may include a transmitter but not a receiver. Some embodiments may have radars 110 that operate in modes such as bistatic receive mode or interferometric modes.

Radars 110 may include many different types of radars. Radars 110 may include Doppler radars. Radars 110 may have polarimetric capabilities, capable of controlling the polarization of the transmitted wave for each pulse and the received polarization states from the return of each pulse. Some radars may be single polarization or dual polarization capabilities. Merely by way of example, polarimetric radars may include the following without limitation: switched-dual polarization, dual-channel dual-polarization; and switched dual-channel, polarization-agile radar.

Radars 110 may have different capabilities. Radars 110 may include radars with minimal processing capabilities. Radars 110 may include radars with limited agility on duty cycle and supported waveforms. Radars 110 may include low cost radars. A radar with a limited agility on duty cycle and an ability to support complex waveforms may be referred to as a legacy radar. Merely by way of example, in one exemplary embodiment, radars 110 may include X-band magnetron radars. In some embodiments, radars 110 may include radars with advanced processing capabilities along with having more agility on duty cycle and ability to support complex waveforms. Radars 110 may include transmitters that include but are not limited to magnetron, solid-state, klystron, traveling wave tube, and microwave power module transmitters.

Radars 110 may be part of a network of radars. A network of radars may sometimes be referred to as a networked radar system ("NETRAD"). A network of radars may include multiple radars distributed geographically. A networked radar system may include radars with overlapping coverage. The network of radars may be in communication with a computer system which may include a processor and a controller. A processor may be used to process data received from the network of radars. Radars 110 may be network-controllable. In some embodiments, at least one radar 110 may include computer system functionality and/or be coupled with a computer system. A computer system that may be part of a system including multiple radars 110 is described in more detail below.

Received Signal from Volume Targets

Figure 2:
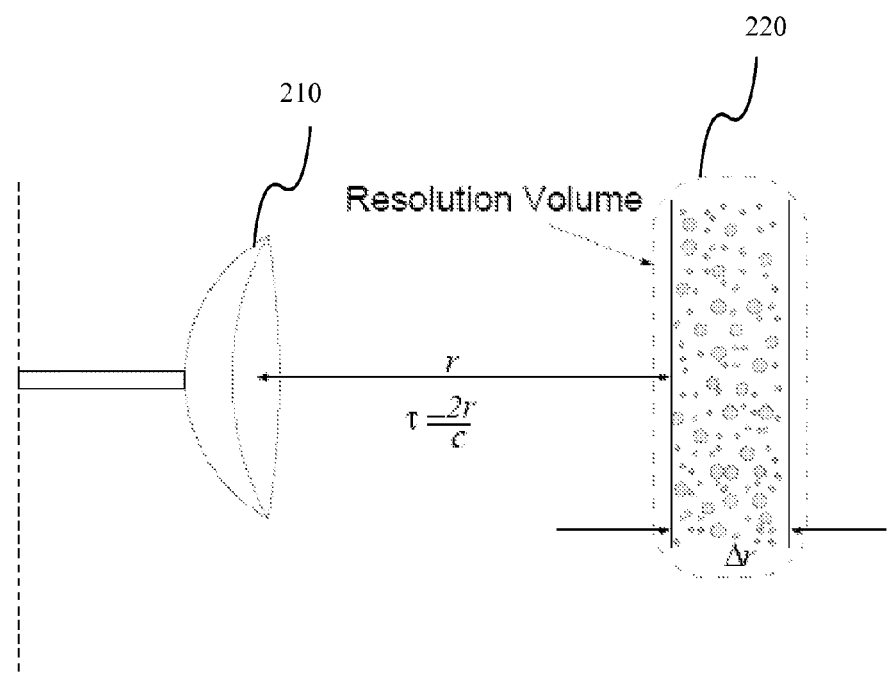
FIG. 2 shows received voltage due to scattering from particles located within a resolution volume extending from (r, r+Δr) in accordance with various embodiments.

A pulse Doppler radar 210, which may be an example of radar 110 of system 100 from FIG. 1, may transmit a pulse train with a pulse repetition time (PRT) $T_s$. The received voltage from a resolution volume 220 at range r may correspond to the backscattered signal from particles within a volume extending radially from r to r+Δr, as illustrated in FIG. 2. The back-scattered signals from the particles within a single resolution volume may sum to a resultant voltage sample at the receiver at time t (range, r) that may be represented as:

$$v_r(t) = \sum_k a_k(\tau_k; t) e^{-j2\pi f_0 \tau_k} g(t - \tau_k) \quad \text{Equation 1}$$

where $a_k$ is the scattering amplitude of the $k^{th}$ particle in the resolution volume and g(t) is the complex envelope of the transmit pulse operating at a frequency $f_0$ and $T_k = 2r_k/c$ where c is the speed of light. A more detailed description of the properties of the received voltage can be found in Bringi, V. N. and V. Chandrasekar, *Polarimetric Doppler Weather: Principles and Applications* (Cambridge University Press, New York, N.Y. 2001), the entire disclosure of which is incorporated herein by reference for all purposes. The mean power received from the resolution volume may be represented as:

$$\bar{P}_r(t) = \langle |v_r(t)|^2 \rangle = \sum_k \langle |a_k(\tau_k; t)|^2 \rangle |g(t - \tau_k)|^2 \quad \text{Equation 2}$$

$$= \frac{\lambda^2 P_t}{(4\pi)^3} \sum_k \left\langle \frac{G_k^2 4\pi |S_k|^2}{r_k^4} \right\rangle |g(t - \tau_k)|^2 \quad \text{Equation 3}$$

where $\langle \cdot \rangle$ indicates ensemble averaging and the time-dependence of $a_k(\tau_k;t)$ is not considered in some cases because it may be reasonable to assume that $a_k(\tau_k;t)$ is stationary over the duration of the transmit pulse. $G_k$ is the antenna gain in the direction of the $k^{th}$ particle. The mean radar cross-section per unit volume, $\eta(r, \theta, \emptyset)$, may be defined by $$\eta(r, \theta, \phi) \Delta V = \sum_k \langle 4\pi |S_k|^2 \rangle \quad \text{Equation 4}$$

where Δ V is the elemental volume. The mean received power from range $r_o$ can be expressed as an integral of weighted $\eta(r, \theta, \phi)$ over the resolution volume of the beam $$\bar{P}_r(t) = \frac{\lambda^2 P_t}{(4\pi)^3} \int_V \frac{G^2(\theta, \phi)}{r^4} \eta(r, \theta, \phi) |g(t - \tau)|^2 dV \quad \text{Equation 5}$$

$$= \frac{\lambda^2 P_t}{(4\pi)^3} \int_\Omega \int_{r_0 + \Delta r/2}^{r_0 - \Delta r/2} \frac{G^2(\theta, \phi)}{r^2} \eta(r, \theta, \phi) |g(t - \tau)|^2 dr d\Omega. \quad \text{Equation 6}$$

$G(\theta, \phi)$ is the two-way antenna power pattern and Ω is the elemental solid angle subtended by the resolution volume. The antenna power pattern may be expressed in terms of peak power pattern $G_o$ and normalized power pattern $f(\theta, \phi)$ as $G(\theta, \phi) = G_o f(\theta, \phi)$. Then the mean received signal may be given by:

$$\bar{P}_r(t) = \frac{\lambda^2 P_t G_0^2}{(4\pi)^3} \int_\Omega \int_{r_0 + \Delta r/2}^{r_0 - \Delta r/2} \frac{f^2(\theta, \phi)}{r^2} \eta(r, \theta, \phi) |g(t - \tau)|^2 dr d\Omega. \quad \text{Equation 7}$$

Resolution of Measured Reflectivity

In some embodiments, the resolution of measured reflectivity may be represented as a function of the antenna beamwidth, scan speed, and the transmitted pulse width. The resolution along range may be represented as a function of the transmit pulse length. The cross-range or azimuthal resolution may be represented as a function of the beam width and the range to the resolution volumes shown in FIG. 3, where radar 310 may be an example of radar 110 of system 100 from FIG. 1 and/or radar 210 of FIG. 3. The range resolution may be related to the pulse width $T_o$ as $$\Delta r = \frac{cT_0}{2}. \quad \text{Equation 8}$$

In some cases, the reflectivity may be assumed to be uniform along range within Δr and the complex envelope of the transmit pulse may be rectangular, then Equation 7 may be rewritten as:

$$\bar{P}_r(r_0) = \frac{cT_0}{2} \left[ \frac{\lambda^2 P_t G_0^2}{(4\pi)^3 r_0^2} \right] \int \int f^2(\theta, \phi) \eta(r_0, \theta, \phi) d\theta d\phi. \quad \text{Equation 9}$$

Doppler weather radar generally has good range resolution due to the short transmit pulse width. Typically, range resolution may be from 50-200 m. However, the azimuthal resolution may degrade as the range increases and may be represented by:

$$\Delta R_{ex} = r\theta_B \quad \text{Equation 10}$$

where $\theta_B$ (or $\phi_B$) is the antenna beam-width.

The antenna pattern may be decomposed into two orthogonal components. One component may define the pattern in elevation and the other may define the pattern in azimuth. The antenna pattern can now be expressed as $f(\theta, \phi) = g(\theta) g(\phi)$. Doppler weather radars traditionally scan in the azimuth domain and if one lumps the reflectivity integrated over the elevation angle $\phi_o$ as $\eta(r_o, \theta, \phi_0)$ then Equation 9 can be written as:

$$\bar{P}_r(r_0) = \frac{cT_0}{2} \left[ \frac{\lambda^2 P_t G_0^2}{(4\pi)^3 r_0^2} \right] \int g^2(\theta) \eta(r_0, \theta, \phi_0) d\theta. \quad \text{Equation 11}$$

In addition to the range dependent beam broadening in Equation 10, antenna motion during the integration cycle can also effectively broaden the beam. The effective antenna pattern may be represented as:

$$f_e = g^2 * w = \int_{-\infty}^{\infty} g^2(\theta - \xi) w(\xi) d\xi \qquad \text{Equation 12}$$

where $$g(\theta) = \exp\left\{-4\ln(2)\frac{\theta^2}{\theta_B^2}\right\} \qquad \text{Equation 13}$$

and $$w = \begin{cases} 1 & |\theta| \leq \Delta \\ 0 & \text{otherwise.} \end{cases} \qquad \text{Equation 14}$$

In Equation 12, $g(\theta)$ is the intrinsic antenna pattern in azimuth and w is the rectangular window function extending $\Delta$ in azimuth. The length of w may depend on the dwell time of the integration cycle. The effective antenna pattern may be represented as:

$$f_e(\theta) = \frac{\theta_B}{4}\sqrt{\frac{\pi}{2\ln 2}} \qquad \text{Equation 15}$$

$$\left\{\text{erf}\left[\frac{\sqrt{8\ln 2}}{\theta_B}\left(\theta_B + \frac{\Delta}{2}\right)\right] - \text{erf}\left[\frac{\sqrt{8\ln 2}}{\theta_B}\left(\theta_B - \frac{\Delta}{2}\right)\right]\right\}.$$

Figure 4:
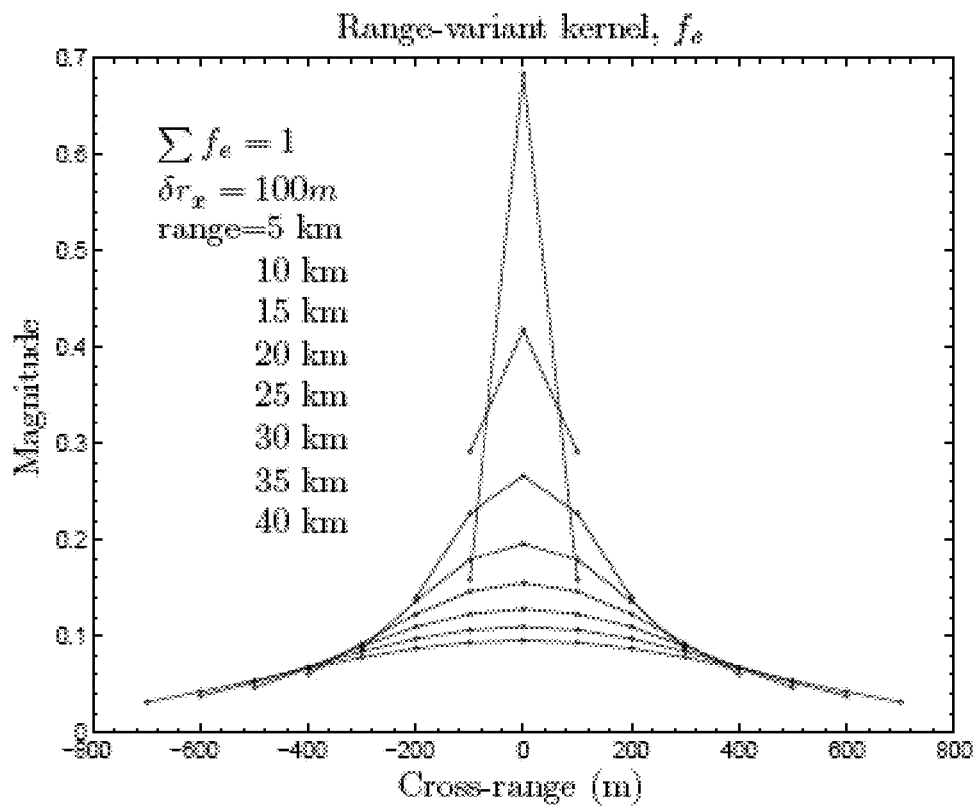
FIG. 4 shows a graph illustrating range-variant discrete Gaussian kernel in accordance with various embodiments.

The effective antenna pattern may form a range-variant kernel relating the reflectivity and the mean received power. The range-variant kernel is shown in FIG. 4 as a function of cross-range distance with the range to the resolution volume as a parameter. It can be seen that the kernel generally gets broader with range implying that measured reflectivity is a smeared version of the intrinsic reflectivity and the smearing effect may get worse with range. In other words, the cross-range resolution of reflectivity in azimuth may be governed by the range-variant kernel given by Equation 15.

Figure 5:
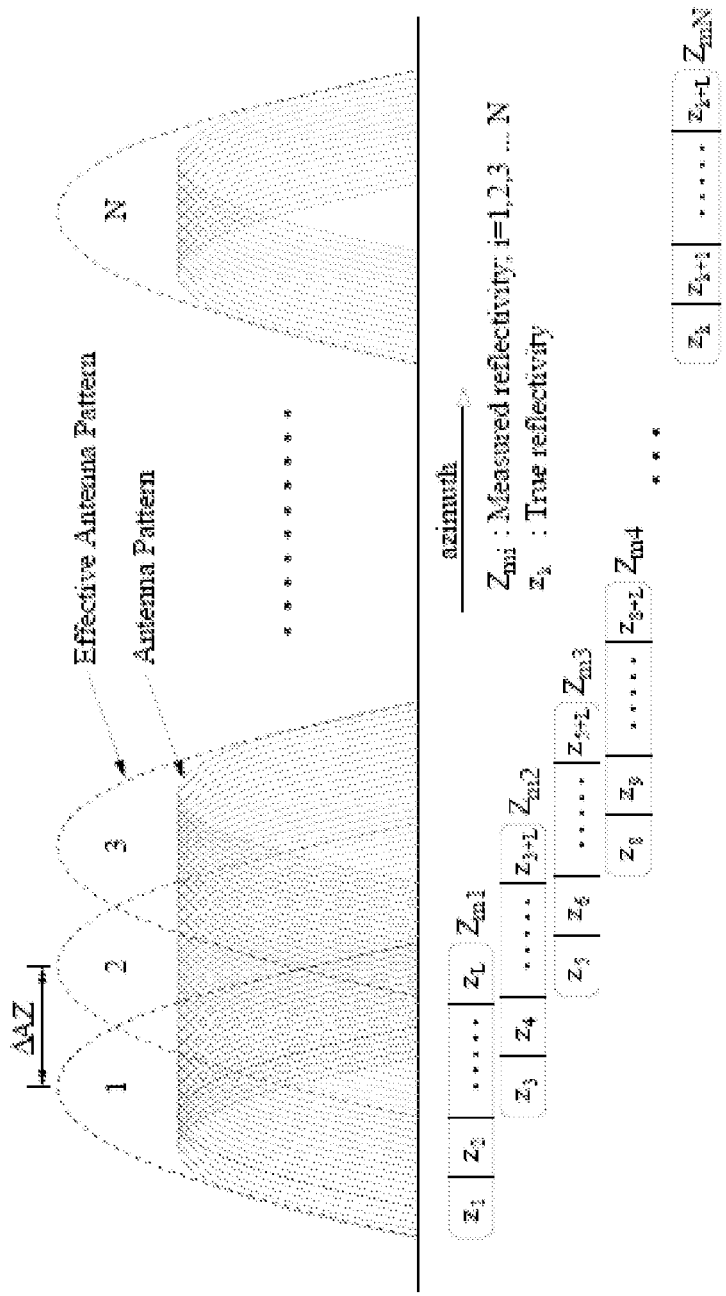
FIG. 5 illustrates azimuthal sampling of reflectivity and its relation to the effective antenna pattern in accordance with various embodiments.

The measured reflectivity is generally smoothed in azimuth and elevation due the effective antenna pattern. The following considers smoothing in azimuth as described in detail above; however, a similar analysis may be provided for the smoothing in elevation. FIG. 5 provides an example that can illustrate the relation between measured reflectivity and the effective antenna pattern in a discrete form. The intrinsic or true reflectivity $z_k$ (in $mm^6 m^{-3}$) can be discretized according to the desired cross-range resolution. The measured reflectivity in discrete form can be written as:

$$z^m = Fz + \epsilon \qquad \text{Equation 16}$$

where $z^m$ is the vector of measured reflectivity in azimuth at a given range, matrix F is the smoothing kernel derived from Equation 5, z is the vector of intrinsic reflectivity and $\epsilon$ is the noise in the reflectivity measurements. Equation may be an ill-posed problem since F may not be full-rank and may be underdetermined because $\dim(z) > \dim(z^m)$.

Equation 16 is formulated for measurements made at a given range along azimuth but can be extended to two dimensional distribution of reflectivity as given below $$z^m(x,y) = \|\Phi_{x,y} Z\|_1 + \epsilon(x,y) \qquad \text{Equation 17}$$

where Z is the intrinsic two dimensional distribution of reflectivity, $\Phi_{x,y}$ is obtained from the range variant kernel (or spreading function) described above with respect to Equation 15, $z^m(x, y)$ is the measured reflectivity and $\epsilon(x, y)$ is the noise in the measurement. Unlike traditional image processing applications, the spreading function can be position variant.

In a networked radar system with N radars, such as in system 100 of FIG. 1, for example, the governing equations relating the measured reflectivity and the intrinsic reflectivity distribution at the $j^{th}$ radar node may be given by $$z_j^m(x,y) = \|\Phi_{x,y} Z\|_1 + \epsilon_j(x,y), j=1, 2, \ldots, N. \qquad \text{Equation 18.}$$

The solution of the inverse problem given by Equation 18 can enable the retrieval of two dimensional distribution of reflectivity using a networked radar system.

In some embodiments, determining the measured reflectivities may include attenuation correction (see Liu, Y., B. Bringi, and M. Maki, "Improved Rain Attenuation Correction Algorithms for Radar Reflectivity and Differential Reflectivity with Adaptation to Drop Shape Model Variation," *Geoscience and Remote Sensing Symposium, 2006, IGARSS 2006. IEEE International Conference,* 1910-1913, the entire disclosure of which is incorporated herein by reference for all purposes) on a real-time basis and an attenuation corrected reflectivity product may be provided operationally (see Junyent, F., V. Chandrasekar, D. McLaughlin, E. Insanic, and N. Bharadwaj, "The CASA Integrated Project 1 Networked Radar System," *J. Atmos. Oceanic Technol.,* 2009, the entire disclosure of which is incorporated herein by reference for all purposes). The data used to apply resolution enhancement systems may be an attenuation corrected reflectivity distribution. See also U.S. Pat. No. 7,518,544 entitled "Retrieval of Parameters in Networked Radar Environments," issued Apr. 14, 2009, the entire disclosure of which is incorporated herein by reference for all purposes.

Resolution Enhancement System

Embodiments of a networked radar system, such as system 100 of FIG. 1 for example, can provide measurements of the inherent reflectivity distribution from different look angles using N radar nodes. Doppler weather radars generally operate with very good spatial resolution in range and poor cross range resolution at farther ranges. Embodiments provide methodologies to retrieve higher resolution reflectivity data from a network of radars. In a networked radar environment, each radar may observe a common reflectivity distribution with different spreading function. The principle that the underlying reflectivity distribution should remain identical for all the nodes may be used to solve the inverse problem described above.

Figure 3:
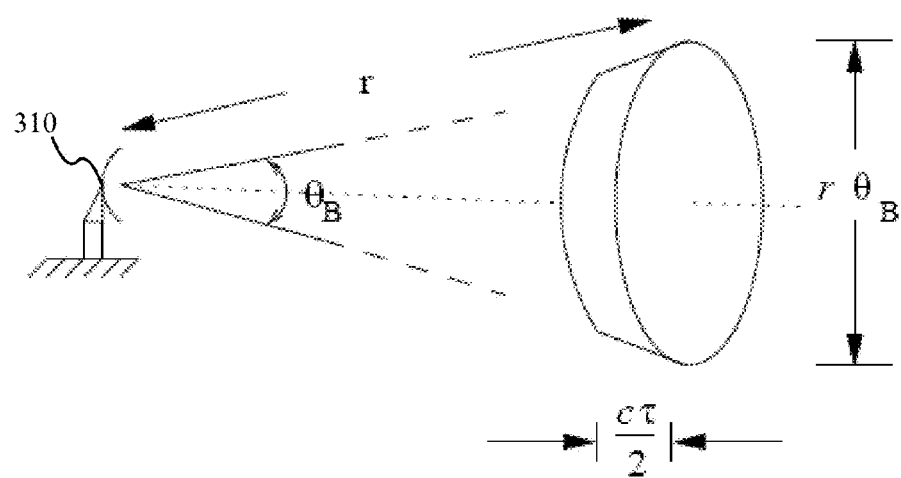
FIG. 3 illustrates resolution volume size as a function of pulse width; range and beam width in accordance with various embodiments.

FIG. 6-a provides an illustration of a precipitation system 630 being measured by two radars 610-a and 610-b, which may be examples or radars such as radars 110, 210, 310 from FIG. 1, FIG. 2, and FIG. 3 respectively, as the two radars scan across the volume. While this example shows two radars, other embodiments may include more radars as discussed above with respect to system 100 for example. FIG. 6-b illustrates the respective reflectivity distribution being measured by each radar for different resolution volumes. FIG. 6-c shows resolution volumes, such as 640-a and 640-b, observed by the respective radars, where the resolution volumes overlap at common volume 650. As can be seen in FIG. 6-b and FIG. 6-c, the measurements in the radial direction may have high spatial resolution but the cross-range resolution may be degraded by the effective antenna pattern. The reflectivity in the cross-beam direction is smeared by the effective antenna pattern as shown in FIG. 6-d. FIG. 6-d also shows common volume 650.

In some embodiments, a vectorized reflectivity matrix, $z_{vec} = \text{vec}(Z)$, may be utilized. Vectorization may be done with the column vector of Z and $z_m(j)$ may be the vector of the measurements made at the $j^{th}$ node that correspond to $z_{vec}$. Equation 18 can then be written as:

$$z_m(j) = G(j) z_{vec} \qquad \text{Equation 19}$$

In Equation 19, G is the spreading function that may be obtained from $\Phi_{x,y}$ for each respective radar j. In this example, the noise term has been ignored for simplicity, but may be taken into account in different embodiments. The impact of the measurement noise on the performance is described below. The inverse problem at each radar node can be combined using the fact that the inherent distribution of reflectivity may be identical for each radar node. The inverse problems from each radar node given in Equation 19 can be combined as:

$$\sum_{j=1}^{N} G_j^T G_j z_{vec} = \sum_{j=1}^{N} G_j^T z_m(j). \qquad \text{Equation 20}$$

$$\text{Let } G_n = \sum_{j=1}^{N} G_j^T G_j$$

denote the networked radar transformation matrix and network transformed measured reflectivity be $$z_{gm} = \sum_{j=1}^{N} G_j^T z_{m(j)}.$$

Now the reflectivity distribution can be obtained by solving a minimization problem:

$$\min \|G_n z_{vec} - z_{gm}\|_2^2 \qquad \text{Equation 21.}$$

While the minimization problem is an example of a more general technique of finding an optimization problem, some embodiments may be formalized into a maximization problem.

The minimization problem found in Equation 21 may be solved in numerous well known ways, including, but not limited to finding a least-squares solution, which can be computed as $$\hat{z}_{vec}^{LS} = \sum_{i=1}^{rank(G_n)} \frac{u_i^T z_{gm}}{\sigma_i} v_i. \qquad \text{Equation 22}$$

where $u_i$, $v_i$ and $\sigma_i$ are the left singular vector, right singular vector and singular values of $G_n$ respectively. The stability of the solution for the minimization problem given in Equation 21 is governed by the properties of $G_n$ and $z_{gm}$. The presence of noise $\tilde{z}_{gm} = z_{gm} + \epsilon$ and the least-squares solution can be given by:

$$\hat{z}_{vec}^{LS} = \sum_{i=1}^{rank(G_n)} \frac{u_i^T z_{gm}}{\sigma_i} v_i + \sum_{i=1}^{rank(G_n)} \frac{u_i^T \epsilon}{\sigma_i} v_i. \qquad \text{Equation 23}$$

The stability of the solution can depend on the relative rate of decay of $u_i^T z_{gm}$ and $u_i^T \epsilon$ with respect to rate of decay $\sigma_i$. The presence of small values of $\sigma_i$ will result in projection of noise in the direction specified by $u_i$ and thereby amplifying noise in the solution. In addition to noise amplification decay rate of $u_i^T z_{gm}$ can be slower than $\sigma_i$ if there are very small values of $\sigma_i$. Therefore, the Picard condition (discussed in Hansen, P. C. *Rank-Deficient and Discrete Ill-posed Problems: Numerical Aspects of Linear Inversion*. SIAM, 1998, the entire disclosure of which is incorporated herein by reference for all purposes) may not be met, which may result in an unstable solution. A constrained least-squares problem with a regularization parameter or Tikhonov regularization can be considered to obtain a stable solution in the presence of measurement error. A stable solution may be obtained by solving the minimization problem:

$$\min \|G_n z_{vec} - \tilde{z}_{gm}\|_2^2 + \sum_{k=1}^{N} \gamma_k^2 \|L_k z_{vec}\|_2^2 \qquad \text{Equation 24}$$

where $\gamma_k$ is the regularization parameter and $L_k$ are the smoothing constraints on the solution. The above minimization problem can be rewritten as $$\min \left\| \begin{bmatrix} G_n \\ \gamma_1 L_1 \\ \vdots \\ \gamma_N L_N \end{bmatrix} z_{vec} - \begin{bmatrix} \tilde{z}_{gm} \\ 0 \\ \vdots \\ 0 \end{bmatrix} \right\|_2^2 \qquad \text{Equation 25}$$

and solved by the method of normal equations, for example, as $$\hat{z}_{vec} = \left( G_n^T G_n + \sum_{k=1}^{N} \gamma_k^2 L_k^T L_k \right)^{-1} G_n^T \tilde{z}_{gm}. \qquad \text{Equation 26}$$

Sampling Lattice for Networked Radar System

The intrinsic reflectivity may be distributed in three dimensional space and may be sampled in a spherical coordinate system at each radar node in some embodiments. Traditionally, multiple radar measurements are merged to a rectangular grid. The following considers sampling over N-dimensional Euclidean space. For example, consider a circularly wavenumber limited function $\{f(x)\} = \{f(x_1, x_2, x_3, \ldots, XN)\}$, whose spectrum is given by $$F(\Omega) = F(\Omega_1, \Omega_2, \Omega_3, \ldots, \Omega_N) = \int_x (f(x) e^{-i\Omega^T x}) dx \qquad \text{Equation 27.}$$

Some embodiments may involve a sampling matrix V corresponding to x that may be given by:

$$V = [v_1, v_2, v_3 \ldots v_N] \qquad \text{Equation 28}$$

where $v_j$ are sampling vectors and any grid point x may be given by $$x = \sum_{k=1}^{N} l_k v_k \qquad \text{Equation 29}$$

where $l_k$ is an integer. The sampling density of N-dimensional Euclidean space may be given by:

$$D = \frac{1}{|\det V|} \frac{\text{samples}}{(\text{unit length})^N}. \qquad \text{Equation 30}$$

Some embodiments may utilize two dimensional sampling in space, though other dimensional sampling may be utilized in some embodiments. Some embodiments may utilize rectangular (Cartesian) sampling. Some embodiments may utilize hexagonal sampling. These are shown respectively in FIGS. 7-a and 7-b. Some embodiments may utilize other sampling shapes, such as triangular sampling, merely by way of further example. In some embodiments, hexagonal sampling may be the optimum sampling scheme for two dimensional signals (see, for example, Petersen, D. P. and D. Middleton, "Sampling and Reconstruction of Wave-Number Limited Functions in N-dimensional Euclidean Spaces," *Information and Control,* 1962, 5, p. 279-323, the entire disclosure of which is incorporated herein by reference for all purposes). The sampling matrix for rectangular and hexagonal grid may be given by $$V_{rect} = \begin{bmatrix} d & 0 \\ 0 & d \end{bmatrix};$$ Equation 31

$$V_{hex} = \begin{bmatrix} d & \frac{d}{2} \\ 0 & \frac{\sqrt{3}\,d}{2} \end{bmatrix}.$$ Equation 32

Figure 7:
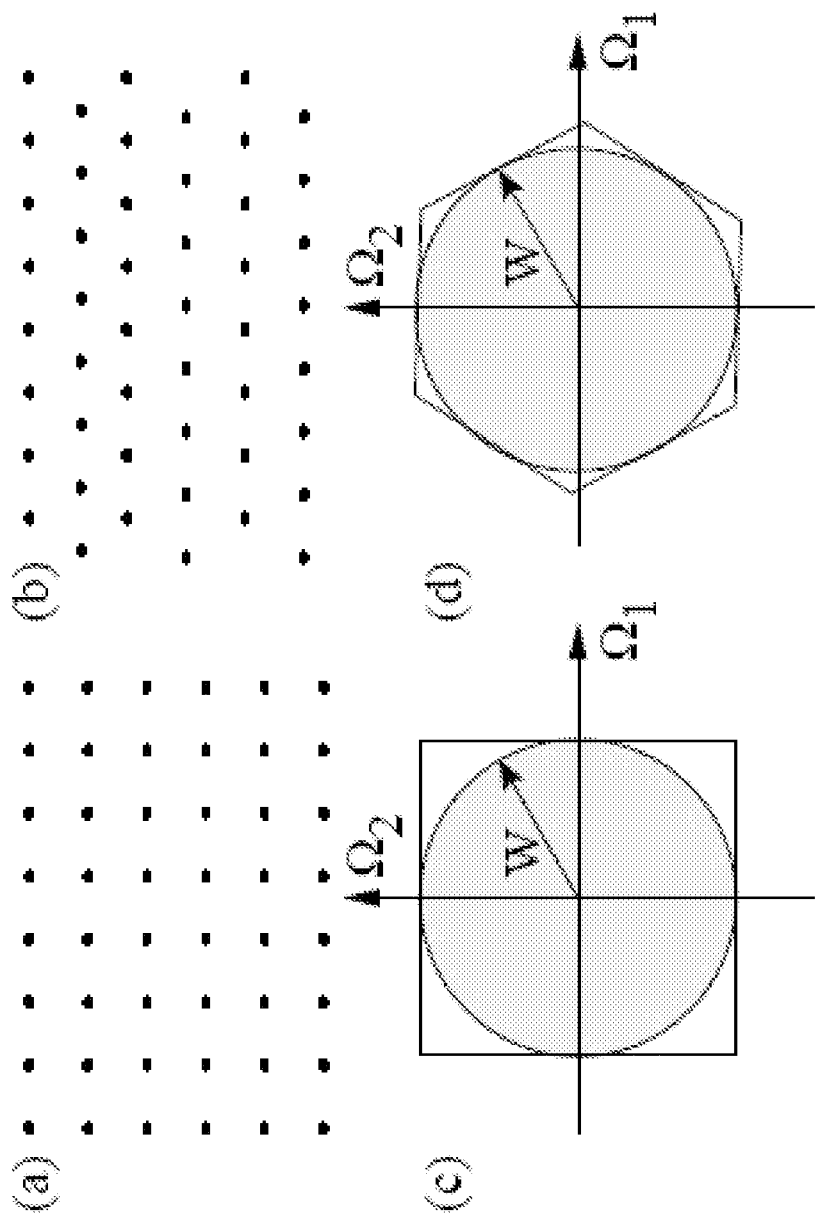
FIGS. 7(a)-(d) illustrate two dimensional sampling: (a) rectangular grid; (b) hexagonal grid (c); a circular band region imbedded in wavenumber domain for rectangular sampling; and (d) a circular band region imbedded in wavenumber domain for hexagonal sampling in accordance with various embodiments.

The signal may be circularly wave-number limited (i.e., $\|\Omega\|^2 \leq W^2$). The signal can be inscribed in a square with length 2W for rectangular grid and the signal can be inscribed in a hexagon with length $2W/\sqrt{3}$ as shown in FIG. 7-c and FIG. 7-d respectively.

The ratio of the sampling density between hexagonal grid and rectangular grid may be represented as:

$$D_r = \frac{|\det V_{rect}|}{|\det V_{hex}|} = \frac{\sqrt{3}}{2} = 0.866.$$ Equation 33

Therefore, the sampling density of hexagonal sampling may be 13.4% less than that of rectangular sampling. In other words, hexagonal sampling of a two dimensional distribution may require 13.4% fewer samples than rectangular sampling. In addition to improved sampling efficiency, hexagonal grids have isotropy in the nearest neighborhood; each hexagon cell has six neighbors, all of whose centers are exactly the same distance away from its center. Also, hexagons are the most compact polygons that are closest to a circle and tile the plane. Due to the numerous advantages offered by hexagonal grids, they have received a great deal of interest as a potential basis for discrete grid systems.

Figure 8:
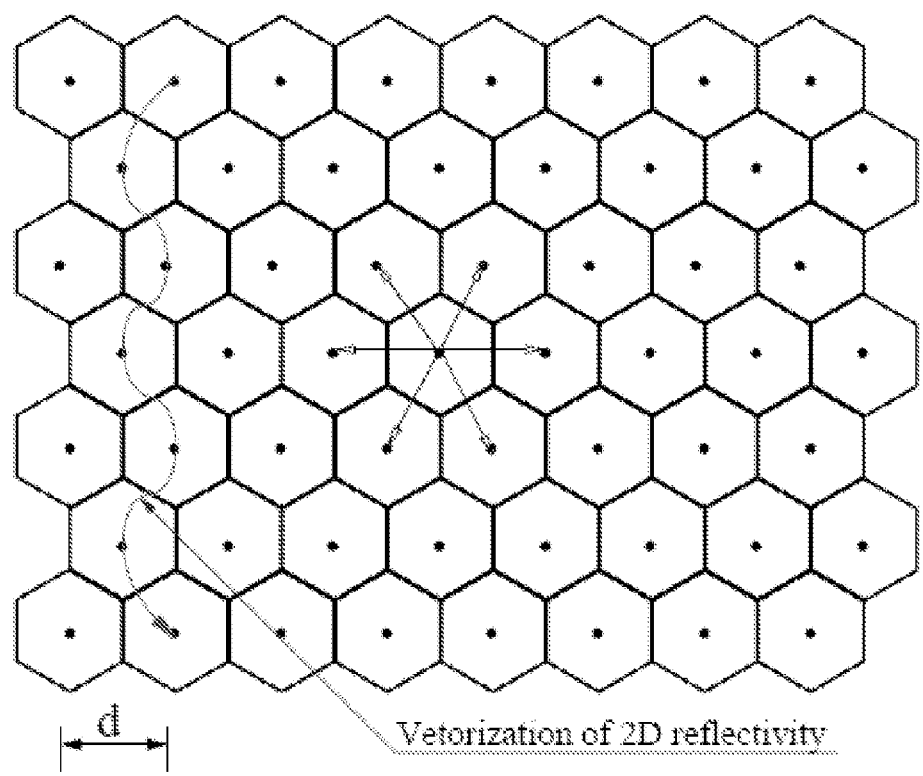
FIG. 8 illustrates a vectorization on a hexagonal grid in accordance with various embodiments.

Some embodiments may utilize a hexagonal grid for retrieval of two dimensional reflectivity distribution. A vectorization of reflectivity distribution Z as described above is shown as a hexagonal grid as shown in FIG. 8. The order of the inverse problem in Equation 21 may be reduced by 13.4% when a hexagonal grid is used in the retrieval of the reflectivity distribution.

In some embodiments, a common coverage area of the radars in the network can be in excess of 30×30 km². Therefore, the size of the inverse problem can become very large depending on the grid resolution of the retrieved reflectivity. In order to overcome this problem, the total coverage region can be broken down into smaller tiles in some embodiments. In addition to lowering dimensionality, tiling can enable parallel processing of these tiles. The size of the tile may be selected such that each tile includes enough measurement points from individual radars. The size of the tile may be selected such that the inverse problem will not be ill conditioned. For example, the inverse problem may become severely ill-conditioned with very few measurements if the tile size is small.

Selection of Regularization Parameter

The regularization parameters can be an important term in the least-squares solution of the inverse problem in Equation 24. The plot of $\|z_{vec}\|_2$ versus $\|G_n z_{vec} z_{gm}\|_2$ on a log-log scale often has a characteristic L shape. This characteristic plot is called an L-curve (see Hansen, P. C. "Analysis of Discrete Ill-Posed Problems by Means of the L-Curve," *Siam Review,* 1992, 34, pp. 56-590, the entire disclosure of which is incorporated herein by reference for all purposes) and the value of y that provides a solution closest to the corner of the L-curve is often chosen as the best solution. However, L-curves are based on the empirical observation and these L-curves often do not have an L-shape. The absence of the L-shape may indicate that the system is mildly ill-conditioned.

Figure 9:
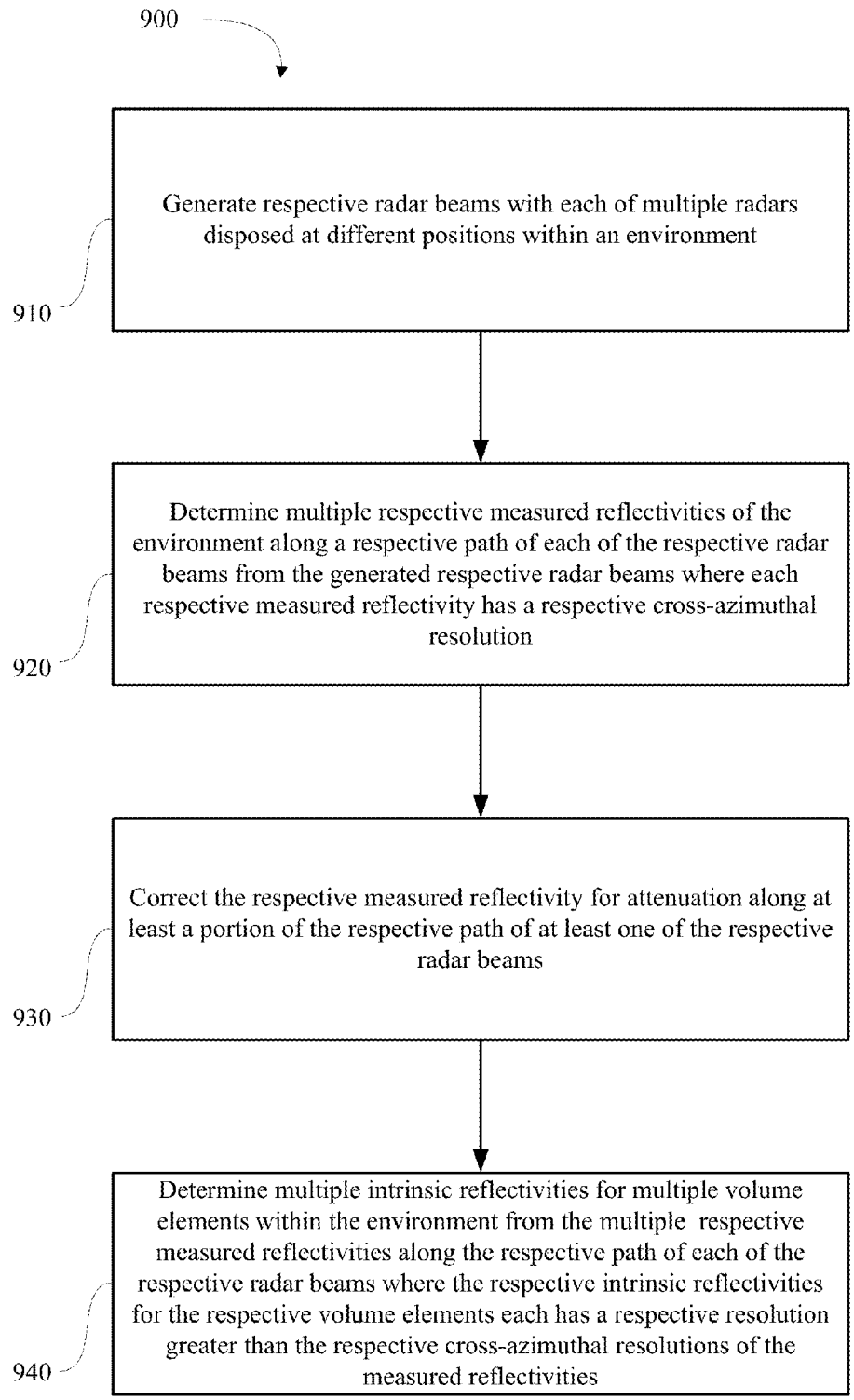
FIG. 9 illustrates of method of operating a radar network in accordance with various embodiments.

Turning now to FIG. 9, a method 900 for operating a radar network as discussed above is further described. The method may be utilized as part of resolution enhancement system 100 of FIG. 1, for example. At block 910, multiple radar beams are generated with each of multiple radars. The radars are disposed at different positions within the environment. As discussed above, the radars may utilize different frequencies. In one embodiment, two or more the respective radars may operate at different frequencies. In another embodiment, at least one of the radars has an X-band frequency.

At block 920, multiple respective measured reflectivities of the environment are determined along each respective path of each of the respective radar beams. Each of the respective measured reflectivities has a respective cross-azimuthal resolution. In some embodiments, a block 930 is provided where determining the multiple respective measured reflectivities also includes correcting for attenuation along at least a portion of the respective path of at least one of the respective radar beams. In some embodiments, attenuation correction for each of the measured reflectivities may be performed.

At block 940, multiple intrinsic reflectivities for multiple volume elements within the environment are determined from the multiple respective measured reflectivities along the respective path of each of the respective radar beams. The respective intrinsic reflectivities for the respective volume elements each has a respective resolution greater than the respective cross-azimuthal resolutions of the measured reflectivities. In some embodiments, determining the intrinsic reflectivities may include utilizing a spreading function for each of the multiple radars. The spreading functions may be position variant. In some embodiments, determining the intrinsic reflectivities may include solving a minimization problem as described above. For example, the minimization problem may be represented as $\min \|G_n z_{vec} - z_{gm}\|_2^2$, where $$G_n = \sum_{j=1}^{N} G_j^T G_j$$

represents a networked radar transformation matrix, $$z_{gm} = \sum_{j=1}^{N} G_j^T z_{m(j)}$$

represents a network transformed measured reflectivity, $G_j$ represents the spreading function for a jth radar, N equals the number of radars in the plurality of radars, $z_m(j)=G(j)z_{vec}$ represents a vector of the plurality of measured reflectivities for the jth radar that correspond to $z_{vec}$ that represents a vectorized intrinsic reflectivity matrix.

In some embodiments, different grids may be utilized for sampling the multiple intrinsic reflectivities for the multiple volume elements with the environment. For example, some embodiments may utilize a hexagonal grid. Some embodiments may utilize a Cartesian grid. In some embodiments, determining the multiple intrinsic reflectivities may include dividing a common coverage area into multiple regions, wherein each region includes at least a subset of the multiple volume elements. In some embodiments, each region may be processed in parallel to determine the multiple intrinsic reflectivities.

The methods, systems, and devices described above may be implemented with a and/or utilize one or more computational devices such as shown schematically in FIG. 10, which broadly illustrates how individual system elements may be implemented in a separated or more integrated manner. The device 1000 is shown comprised of hardware elements that are electrically coupled via bus 1026. The hardware elements include a processor 1002, an input device 1004, an output device 1006, a storage device 1008, a computer-readable storage media reader 1010*a*, a communications system 1014, a processing acceleration unit 1016 such as a DSP or special-purpose processor, and a memory 1018. The computer-readable storage media reader 1010*a* is further connected to a computer-readable storage medium 1010*b*, the combination comprehensively representing remote, local, fixed, and/or removable storage devices plus storage media for temporarily and/or more permanently containing computer-readable information. The communications system 1014 may comprise a wired, wireless, modem, and/or other type of interfacing connection and permits data to be collected from the radars. In some instances, such data collection is performed in real time by the communications system in evaluating the intrinsic parameters of the environment.

The computational device 1000 also comprises software elements, shown as being currently located within working memory 1020, including an operating system 1024 and other code 1022, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

As described above, embodiments are generally applicable to any system having a multiple radars in a networked arrangement. While some specific applications are noted here, this identification is not intended to be exhaustive and the generality of the methods will allow those of skill in the art to realize numerous other applications after reading this disclosure.

In some embodiments, the multiple radars are disposed in fixed locations, such as on an arrangement of cellular-telephone towers. Such a distribution of radars permits investigation of various geographical regions, perhaps by using subsets of the total number of radars when focusing on specific geographical regions, to provide a quantitative measurement of precipitation.

Furthermore, it was previously noted that the methods are not restricted to networks in which all of the radars operate at the same frequency. Since the network may have radars with different operational frequencies, it is possible to add radars to the network without being constrained by the character of the existing radars. For instance, a network that already comprises multiple C-band radars may be expanded with the addition of X-band radars. This gives the technique considerable flexibility that may be exploited differently in different circumstances to meet a variety of different requirements.

In some embodiments, the radars are disposed on objects that are in motion. For instance, the radars could be provided on emergency land vehicles so that when the vehicles are disposed to the site of an accident or disaster, they may be used to form a radar network. The flexibility of the methods to accommodate different frequencies may also be realized in these types of embodiments since it may not be known in advance which vehicles will be dispatched to a particular site and vehicles provided by different response departments could operate of different frequencies.

Furthermore, the radar network may be formed even while the vehicles are in motion, providing a dynamic radar network that may collect measurements and retrieve intrinsic parameters as the location and overall shape of the network changes with the motion of the vehicles. This is because the time for retrieval of the parameters is an electronic timescale, which is much smaller than the timescale of motion of the vehicles. Radars may thus advantageously be disposed on any type of vehicle, including land vehicles like cars, buses, trains, and the like; may be disposed on any type of airborne vehicle, including airplanes, helicopters, and the like; and may be disposed on any type of seagoing vessel, including ships, submarines, and the like. Indeed, there may be circumstances when both land and air vehicles have radars used in forming the network, or when both air and sea vehicles have radars used in forming the network, etc.

Embodiments may make use of a networked radar environment in which multiple electromagnetic beams are generated by a corresponding multiple radars. The basic principle of such a networked arrangement may be to provide good coverage, in terms of accuracy and resolution to a focused area using the radar network. In various embodiments, the frequency of each of the radars may be greater than 4 GHz, greater than 6 GHz, greater than 8 GHz, greater than 10 GHz, or greater than 12 GHz. In some instances, each of the radars may operate at substantially the same frequency, but this is not a requirement of the invention and, in other instances, different radars may operate at substantially different frequencies.

EXAMPLES

Specific simulations performed by the inventors are presented to evaluate the performance of different embodiments of resolution enhancement systems. The simulations are performed in a networked environment with four radar nodes. The radars are located to match the positions of the four radar in the Integrated Projects-I (IP1) testbed deployed by Colloborative Adaptive Sensing of the Atmosphere (CASA) in Oklahoma. A composite reflectivity is obtained based on the networked retrieval technique. In addition, composite reflectivities based on range weighted averaging and maximum reflectivity are also estimated. The range weighted averaging of reflectivity from multiple radars uses the fact that the resolution and signal-to-noise ratio degrades with range. Reflectivity from individual radars are relatively weighted such that measurements from the closest radar is assigned the highest weight while measurement from the farthest radar is assigned the least weight. The weight for the $i^{th}$ radar to obtain a range weighted mosaic is given below.

$$w_i = \frac{R_i^{-p}}{\sum_{j=1}^{N} R_j^{-p}}. \qquad \text{Equation 34}$$

In the above equations, $R_j$ is the range of the resolution volume from the individual radar nodes and p is an integer selected to adjust the dependence on range. The range weighted mosaic may be obtained as given below.

$$Z_{rmean}(x, y) = \sum_{j=1}^{N} w_j(x, y) Z_j(x, y). \qquad \text{Equation 35}$$

Figure 11:
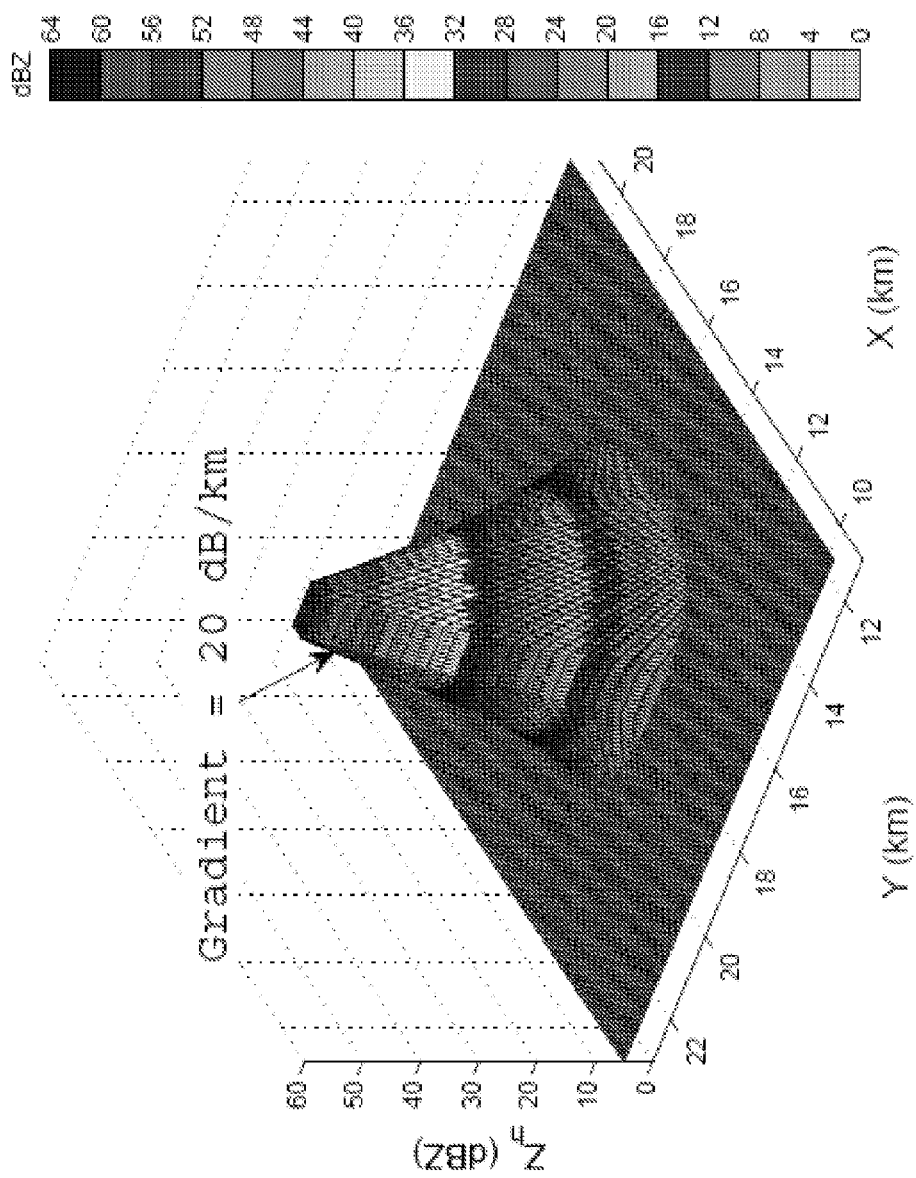
FIG. 11 illustrates a two dimensional flat topped reflectivity distribution with 25 dB/km gradient in accordance with various embodiments.
Figure 12:
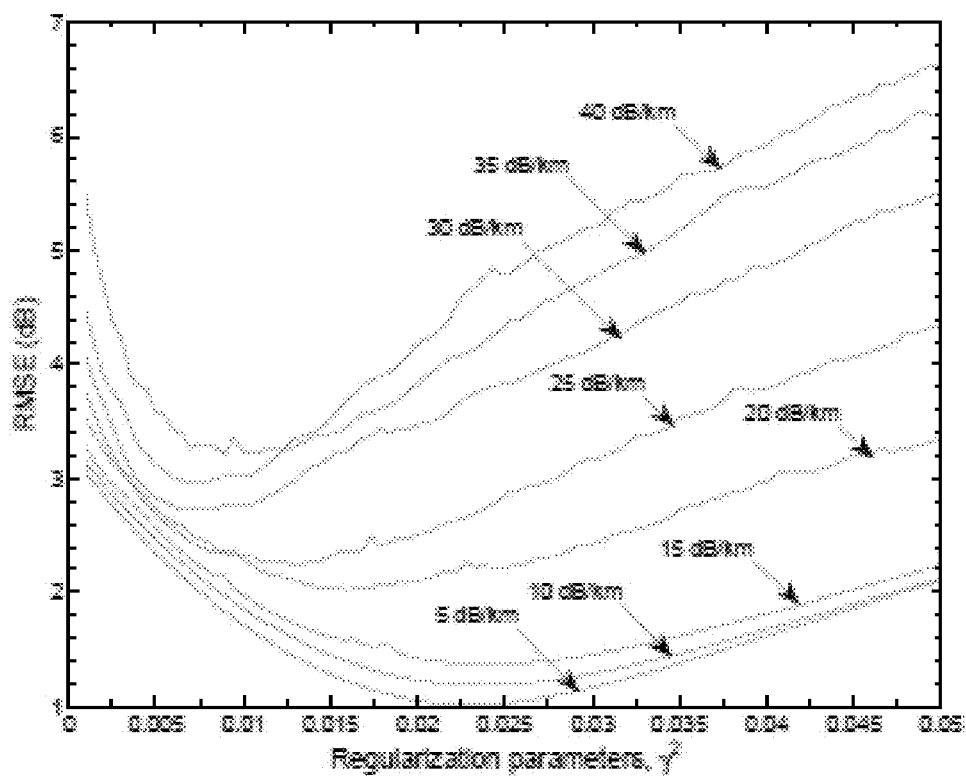
FIG. 12 shows an RMSE of the networked retrieval as a function of a regularization parameter for different gradients in reflectivity in accordance with various embodiments.
Figure 13:
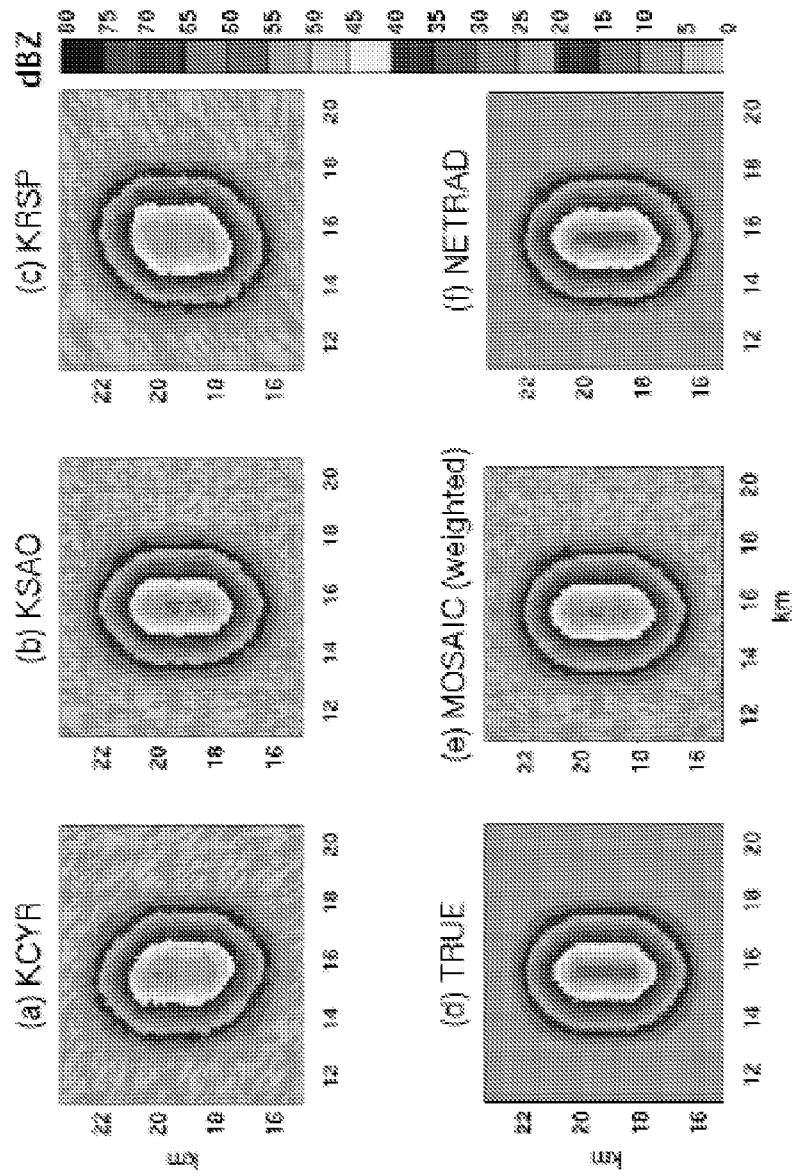
FIGS. 13(a)-(f) illustrate a resolution enhancement system applied to simulated data for a three radar node case with observed reflectivity from (a) KCYR, (b) KSAO, (c) KRSP, (d) true reflectivity distribution, (e) range weighted mosaic, and (f) resolution enhancement system in accordance with various embodiments.

A simulation with 2° beam width was performed with a two dimensional flat-topped reflectivity field with a specified reflectivity gradient as shown in FIG. 11. The simulated reflectivity distribution is positioned in the coverage region of the networked radar system. The measured reflectivity at each node is obtained based on the effective antenna pattern of the radar and measurement error of 1 dB added. The RES solution was obtained for a 6×6 km² tile. The smoothing constrained with $L_1$=I and $L_2$ representing the discrete second order gradient was used. FIG. 12 shows the error of the networked retrieval as a function of with $\gamma_1^2$ with $\gamma_2^2$=0.01. It can be observed that the best regularization parameter is a function of the gradient in reflectivity.

FIGS. 13(a)-(f) show the application of the resolution enhancement system for a simulated data set with 20 dB/km reflectivity gradient. The simulations were performed for a three node configuration with nodes at Cyril, Chickasha and Rush Springs. The observed reflectivity is shown in FIG. 13-a, FIG. 13-b, FIG. 13-c, while the true reflectivity is shown in FIG. 13-d. The smearing effect of the antenna pattern is obvious when the observations are compared with the true reflectivity. The range weighted reflectivity mosaic and networked retrieval is shown in FIG. 13-e and FIG. 13-f respectively. The resolution enhancement system provides a reflectivity that matches the true reflectivity and the smearing effect that lowers the peak reflectivity is mitigated with the resolution enhancement system. The range weighted mosaic performs well at the storm edges to minimize smearing but is not able to retrieve the peak reflectivity in the core of the precipitation cell.

Multiscale Analysis

Spatial variability is intrinsic to the estimated reflectivity distribution in radar meteorology. Spatial variability is dependent on both the scale and support of the estimated reflectivity distribution. Multiscale statistical methods have been extensively used to analyze spatial data. Different statistical methods may be utilized to analyze spatial variability of reflectivity. In particular, Fourier spectrum and variogram may be used to study the spatial variability. The two methods are described briefly. The analysis of the results for a Fourier spectrum method obtained from the networked inversion are presented.

Variogram Analysis

The variogram is a function describing the degree of spatial variability and it is defined as the variance of the difference between values of reflectivities as a function of spatial separation lag vector h. The variogram is given by $$2\gamma(h) = E\{[Z(x) - Z(x + h)]^2\}. \qquad \text{Equation 36}$$

The bias free estimator of Equation 36 is given by:

$$2\hat{\gamma}(h) = \frac{1}{N(h)} \sum_{i=1}^{N(h)} [z(x_i) - z(x_i + h)]^2 \qquad \text{Equation 37}$$

where N(h) is the total number of points corresponding to separation lag h. Directional variograms can be estimated to study variability for specified directions. An omnidirectional variogram ($2\hat{\gamma}(|h|)$) was utilized since anisotropy was not a focus of the simulations. The semi-variogram ($\hat{\gamma}(l)$) is expected to increase with separation lag $l=\|h\|_2$ at least for small scales. The rate at which $\hat{\gamma}(l)$ increases with l is a metric for the smoothness or variability of reflectivity. For instance, $\hat{\gamma}(l)$ for an uncorrelated reflectivity distribution is independent of l whereas $\hat{\gamma}(l)$ monotonically increases with l for correlated and smoother reflectivity distributions.

Isotropic Power Spectrum

The power spectrum of a two dimensional distribution has been used for studying spatial variability over a wide range of scales. The Fourier spectrum can be obtained with a periodogram estimate using 2D FFT as $$F(k) = F(k_1, k_2) = \frac{1}{MN} \left| \sum_{n=0}^{N-1} \sum_{m=0}^{M-1} Z(m, n) \exp\left\{-j 2\pi \left[\frac{m}{M} \frac{n}{N}\right] k\right\} \right|^2 \qquad \text{Equation 38}$$

where k is the wave-number vector with components $k_1$ and $k_2$. To compute the isotropic power spectrum (F(k), $k=\|k\|_2$) the 2D power spectrum is angularly averaged about k=0. Empirical observations suggest cale invariance of reflectivity seen as a power law relation of spatial spectrum with wave-number. The power law relation between spatial spectrum and wave-number is given as $$F(k) \sim k^{-\beta} \qquad \text{Equation 39.}$$

The spatial spectrum roll-off factor β is a measure of the variability or smoothness of the reflectivity distribution. Higher values of β indicate smoother reflectivity distribution while lower β indicates more variability in the reflectivity distribution.

Simulations: Multiscale Analysis

The performance of a resolution enhancement system can be studied by analyzing the isotropic spectrum of the retrieved reflectivity distribution. A simulated reflectivity field may be used to compare the scales of observed and retrieved reflectivity distribution. For example, a 12×12 km area within the coverage of the radar network is simulated. A geometry of the simulated radar network is like the first generation radar network deployed by CASA. The RES solution is obtained for a 6×6 km area at grid resolution 100×100 m and the final solution is a tiling of the individual tiles. This section presents results for two simulated cases. The simulations are performed for radar notes with a beam width of 1.8 degrees and maximum operating range of 40 km. Case I is a precipitation event observed by four radar nodes and Case II is a storm cell observed by three radar nodes.

Figure 14:
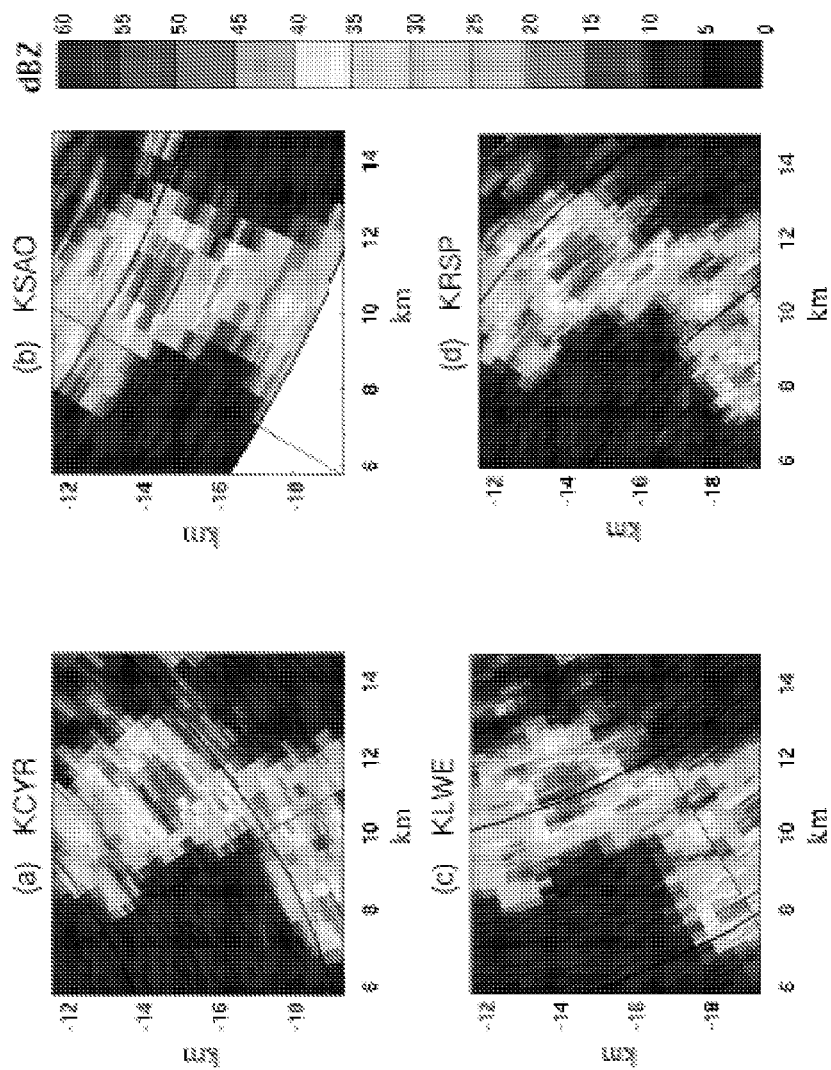
FIGS. 14(a)-(d) illustrate Case I observations of simulated data for a networked radar system with (a) KCYR, (b) KSAO, (c) KRSP, and (d) KLWE in accordance with various embodiments.
Figure 15:
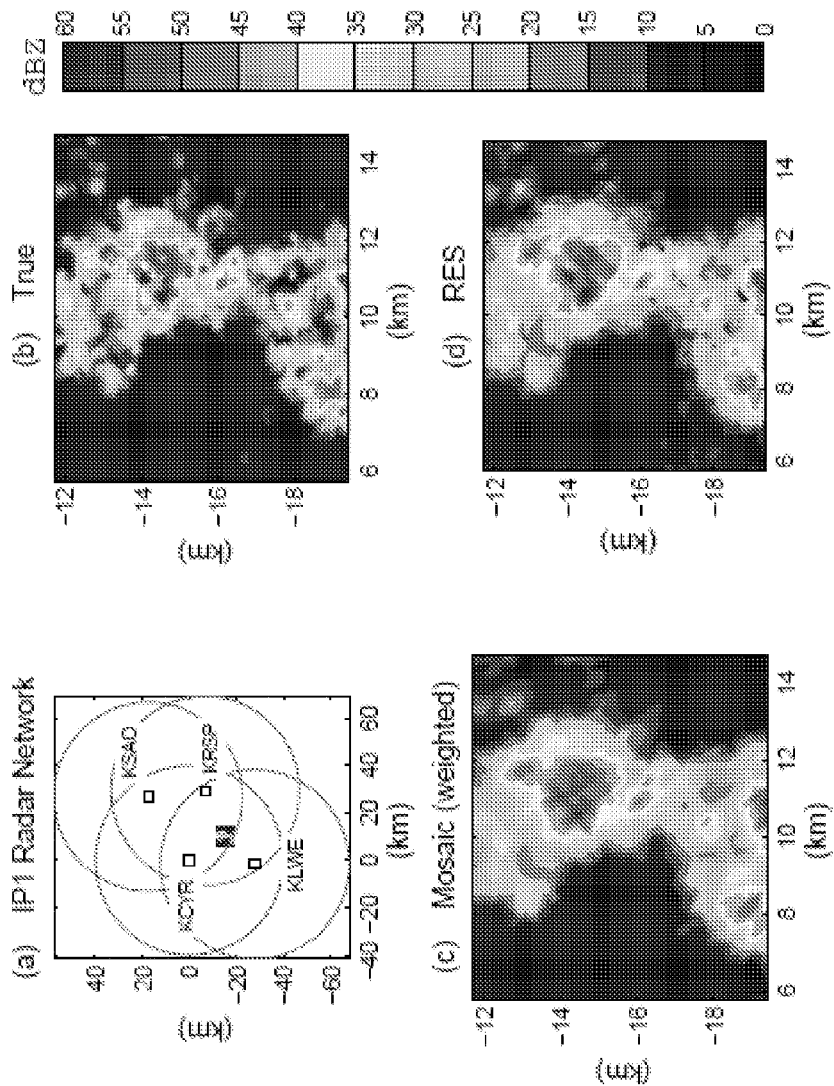
FIGS. 15(a)-(d) illustrate Case I simulated data for a networked radar system for (a) location of storm within the IP1 radar network, (b) true reflectivity distribution, (c) reflectivity mosaic, and (d) RES retrieval in accordance with various embodiments.

The observed reflectivity for Case I is shown in FIGS. 14(*a*)-(*d*). The range weighted reflectivity mosaic and RES retrieved reflectivity distribution for Case I is shown in FIG. 12. The smearing of the observed reflectivity is visible in FIGS. 14(*a*)-(*d*) and a worst cross-range resolution is observed in KSAO because the storm cell is more than 35 km away from the radar as seen in FIG. 15-*a*. The true reflectivity distribution is compared with the range weighted mosaic and RES retrieved in FIG. 15-*b*. It can be observed that the reflectivity mosaic has degraded resolution when compared with the RES reflectivity. The difference in resolution may be seen when some of the very small features are compared between the true reflectivity, mosaic, and RES reflectivity. The small features are much more spatially smeared in the range weighted mosaic when compared to the RES reflectivity.

Figure 16:
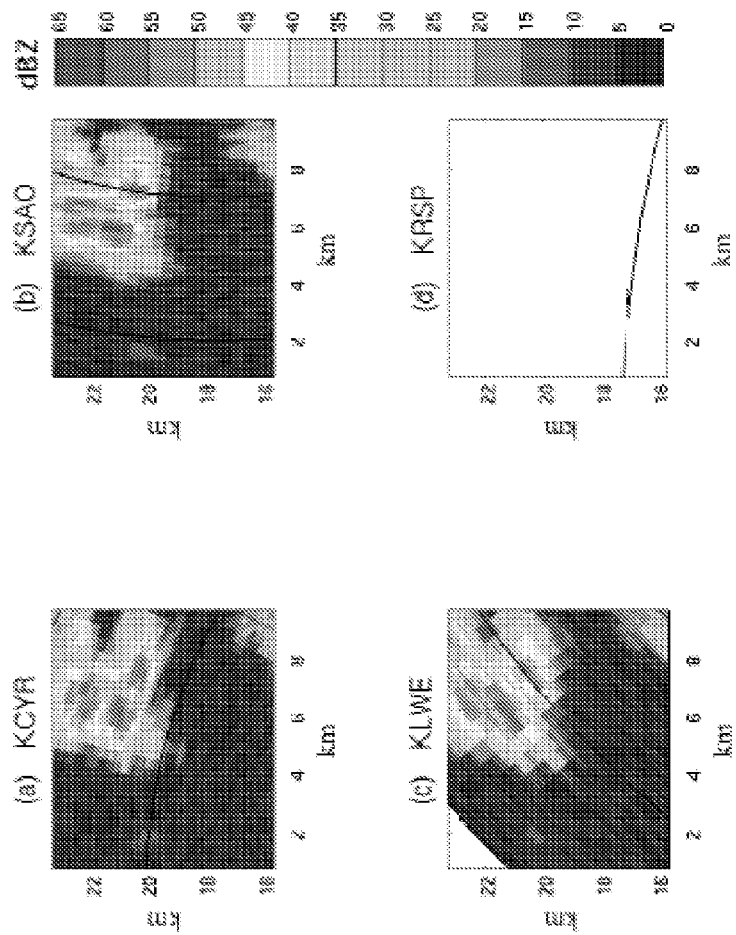
FIGS. 16(a)-(d) illustrate Case II observations of simulated data for a networked radar system with (a) KCYR, (b) KSAO, (c) KIWE, and (d) KRSP in accordance with various embodiments.
Figure 17:
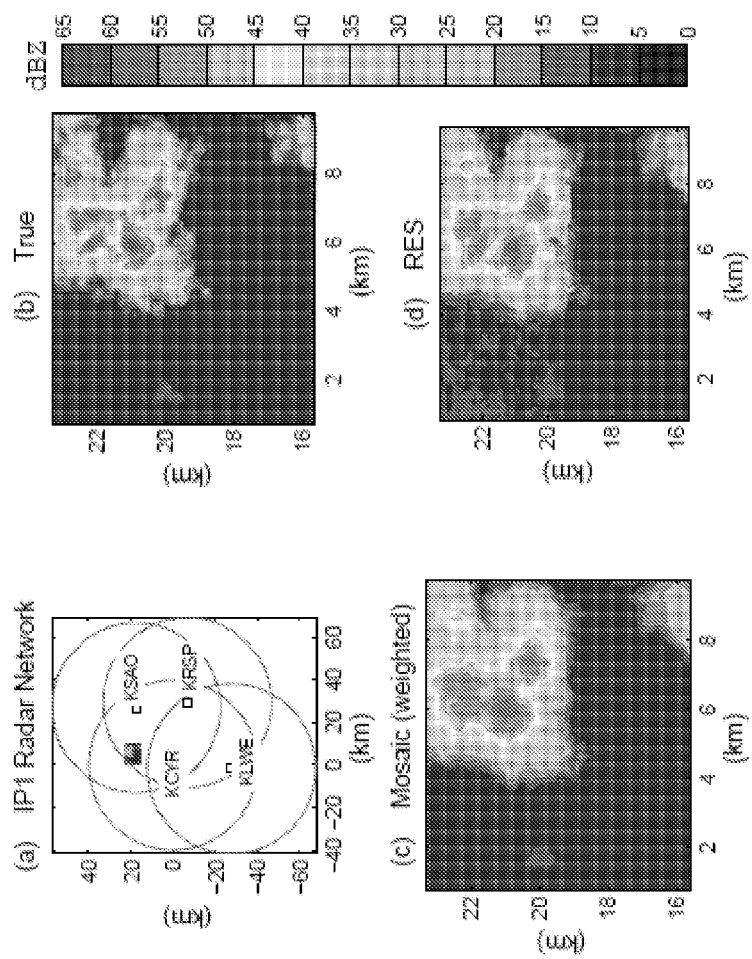
FIGS. 17(a)-(d) illustrate Case II simulated data for a networked radar system with (a) location of the storm within the IP1 radar network, (b) true reflectivity distribution, (c) reflectivity mosaic, and (d) RES retrieval in accordance with various embodiments.

The observed reflectivity in Case II is shown in FIG. 16. The range weighted reflectivity mosaic and RES retrieved reflectivity distribution for Case II is shown in FIG. 17. The storm cell in Case II is observed by three radars and KRSP observations have the worst resolution because the storm is more than 35 km away from KRSP as shown in FIG. 17-*a*. The true reflectivity distribution is compared with the range weighted mosaic and RES retrieval in FIG. 17-*b*. It can be observed that the reflectivity mosaic FIG. 17-*c* has degraded resolution when compared to the RES reflectivity FIG. 17-*d*. About four high reflectivity regions are clearly visible in the true reflectivity distribution and similar high reflectivity regions are visible in the RES reflectivity, whereas the distinction between the high reflectivity regions is not clear in the reflectivity mosaic.

The isotropic power spectrum of the range weighted reflectivity mosaic and RES retrieved reflectivity may be compared to the isotropic power spectrum of the true reflectivity as shown in FIG. 18-*a* (Case I) and FIG. 18-*b* (Case II). The high spatial variability of the reflectivity in Case I when compared to Case II may be easily observed by cross comparing true reflectivities seen in FIG. 15-*d* and FIG. 17-*d*. This higher spatial variability may also be evident from the isotropic power spectrum shown in FIG. 18. The power at small scales (<500 m) in Case I is much higher than in Case II.

FIG. 18 clearly shows the true, mosaic, and RES reflectivities have comparable powers at scales larger than 1 km. However, the powers at scales less than 1 km are attenuated for mosaic and RES with respect to the true reflectivity. Therefore, the variability in reflectivity at smaller scales may not clearly be observed in the reflectivity mosaic and RES. Although mosaic and RES may not observe the variability at all scales, the power at smaller scales for RES is closer to the true reflectivity for both Case I and Case II as shown in FIG. 18-*a* and FIG. 18-*b*. RES may capture small scale variability relatively better than range weighted mosaic.

Analysis of X-Band Networked Radar Data

Figure 19:
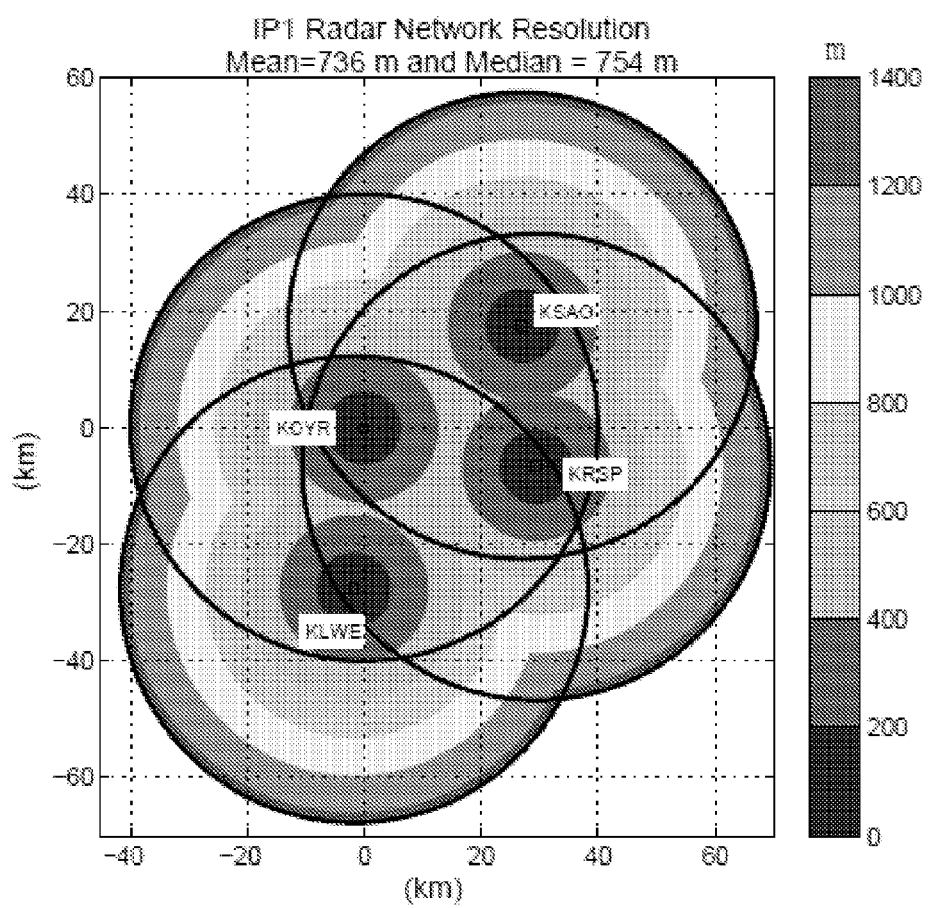
FIG. 19 illustrates a composite networked resolution for CASA's IP1 radar network in accordance with various embodiments.

In this section, the RES methodology is applied to data collected from IP1 testbed. The IP1 testbed is a networked radar system with four radars operating at X-band. Measurements at X-band may suffer the effect of attenuation due to propagation in precipitation. The IP1 radars may perform attenuation correction (see Liu, Y., B. Bringi, and M. Maki, "Improved Rain Attenuation Correction Algorithms for Radar Reflectivity and Differential Reflectivity with Adaptation to Drop Shape Model Variation," *Geoscience and Remote Sensing Symposium, 2006, IGARSS 2006. IEEE International Conference*, 1910-1913, the entire disclosure of which is incorporated herein by reference for all purposes) on a real-time basis and an attenuation corrected reflectivity product may be provided operationally (see Junyent, F., V. Chandrasekar, D. McLaughlin, E. Insanic, and N. Bharadwaj, "The CASA Integrated Project 1 Networked Radar System," *J. Atmos. Oceanic Technol.*, 2009, the entire disclosure of which is incorporated herein by reference for all purposes). The data used to apply RES may be an attenuation corrected reflectivity distribution. See also U.S. Pat. No. 7,518,544 entitled "Retrieval of Parameters in Networked Radar Environments," issued Apr. 14, 2009, the entire disclosure of which is incorporated herein by reference for all purposes. In this example, the four radars are separated by approximately 25 km and make measurements up to 40 km. The radars transmit a short pulse resulting in a range resolution of 60 m. A 1.2 m antenna with a 1.8° beam-width has a mean cross range resolution of 837 m in the coverage region of a single radar. The mean resolution in a networked radar environment may be less than the mean range resolution of an individual radar. The resolution in a networked environment may be obtained by selecting the minimum resolution among the radars within the common coverage area. FIG. 19 shows the resolution in the CASA's IP1 radar network, for example. A mean resolution of 736 m can be obtained by selecting the best resolution from the four IP1 radars. The reflectivity obtained corresponds to a 1° integration cycle that provides oversampled data in azimuth with oversampling factor ~2. The RES may be solved for a grid resolution of 100 m, for example, using a 6×6 km^2 area tile. The origin may be arbitrarily chosen to coincide with the Cyril radar and each radar GPS location may be translated to this new origin. A constrained linear least-squares solution may be obtained to provide the RES reflectivity distribution.

Case I: Small Precipitation Cell

Figure 20:
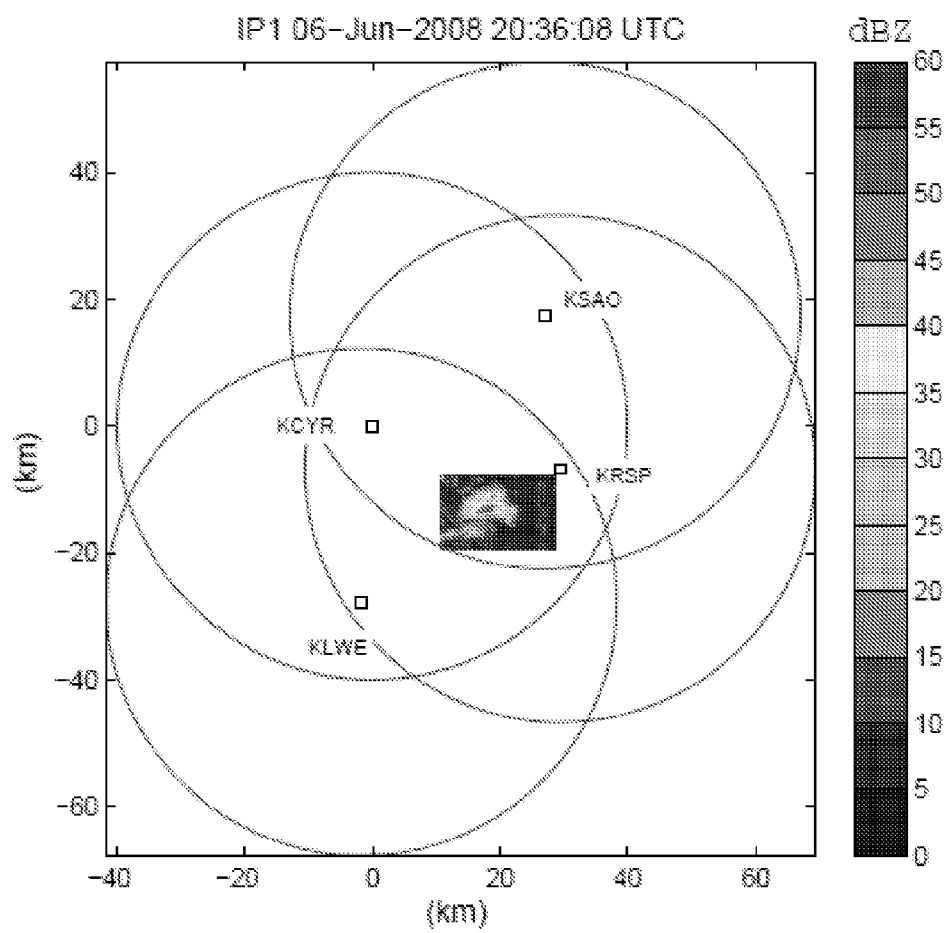
FIG. 20 illustrates the location of the precipitation event in the radar network for data collected with IP1 radar network on 2008 Jun. 6 at 20:36:08 UTC.
Figure 21:
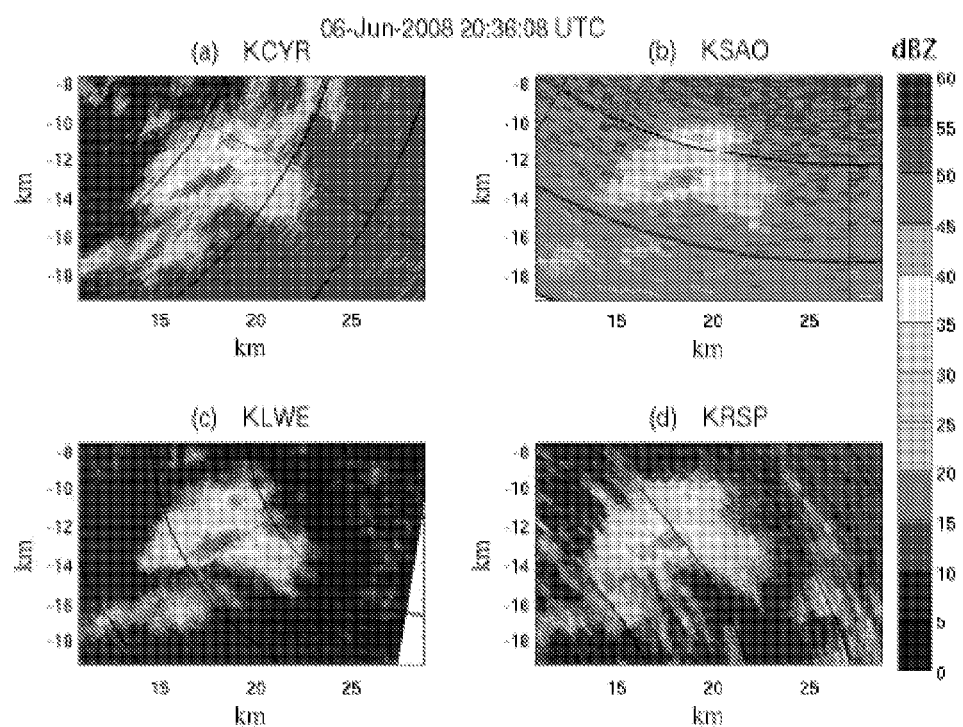
FIGS. 21(a)-(d) illustrate data collected with the IP1 radar network on 2008 Jun. 6 at 20:36:08 UTC (a) KCYR, (b) KSAO, (c) KLWE, and (d)KRSP in accordance with various embodiments.
Figure 22:
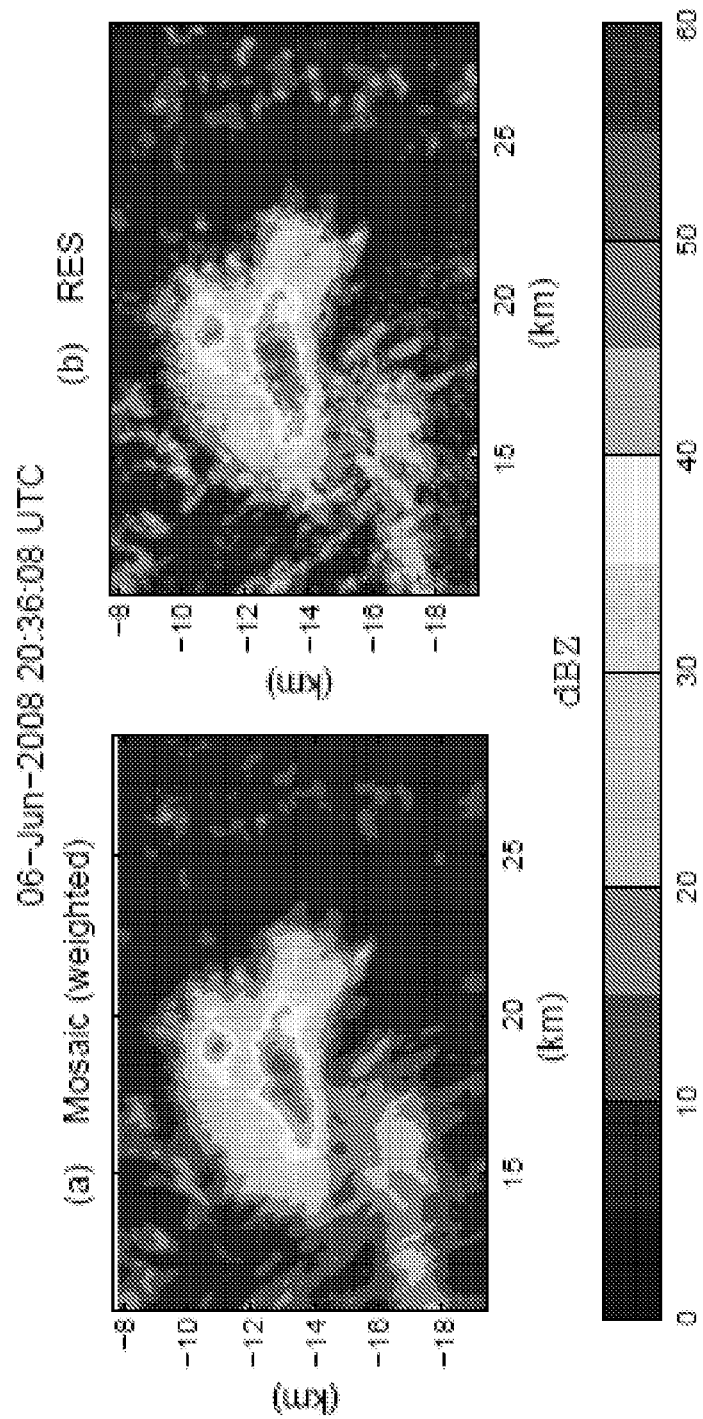
FIGS. 22(a)-(b) illustrate reflectivity retrieval from the IP1 radar network with data collected on 2008 Jun. 6 at 20:36:08 UTC (a) range weighted reflectivity mosaic and (b) RES reflectivity retrieval in accordance with various embodiments.

A small precipitating cell within the coverage of all the four radars was observed on Jun. 6, 2008 at 20:36 UTC. The reflectivity distribution observed at 1° elevation at the four nodes is shown in FIG. 21. The location of the precipitation cell relative to the radar locations is shown in FIG. 20. The observations made by the individual radars are shown in FIG. 21. The smearing effect of the antenna pattern may clearly be seen as the smearing along the azimuth for each radar. The retrieval of reflectivity distribution from range weighted mosaic and resolution enhancement system is shown in FIG. 22-*a* and FIG. 22-*b* respectively. The peak reflectivity at the core of the cell is higher with the resolution enhancement system when compared to the reflectivity mosaic. This observation is similar to the results obtained from simulation.

Case II: Thunder Storm Cell

Figure 23:
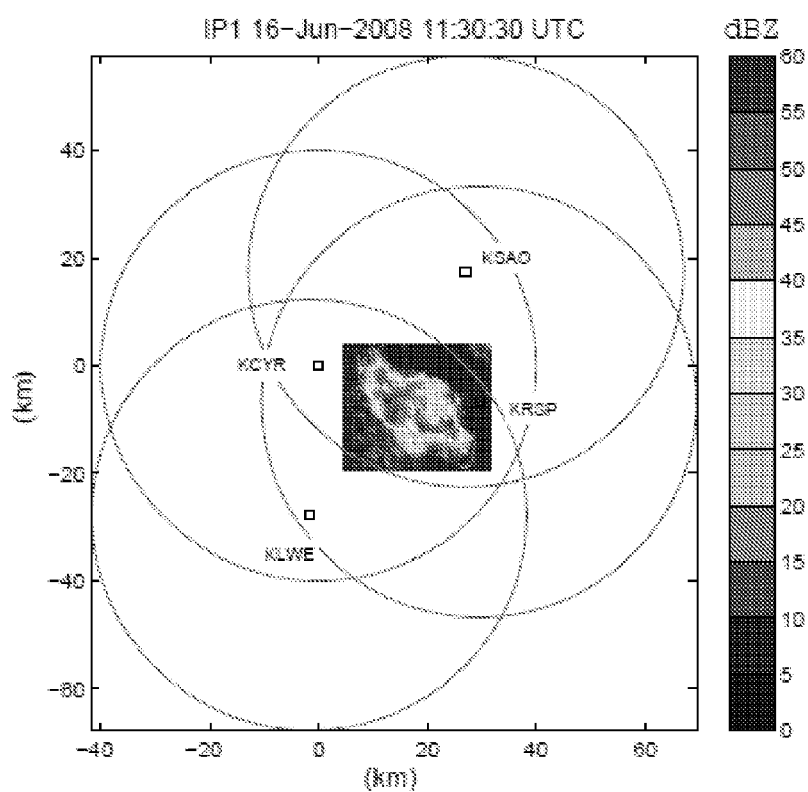
FIG. 23 illustrates the location of the precipitation event in the radar network for data collected with the IP1 radar network on 2008 Jun. 16 at 11:30:30 UTC.
Figure 24:
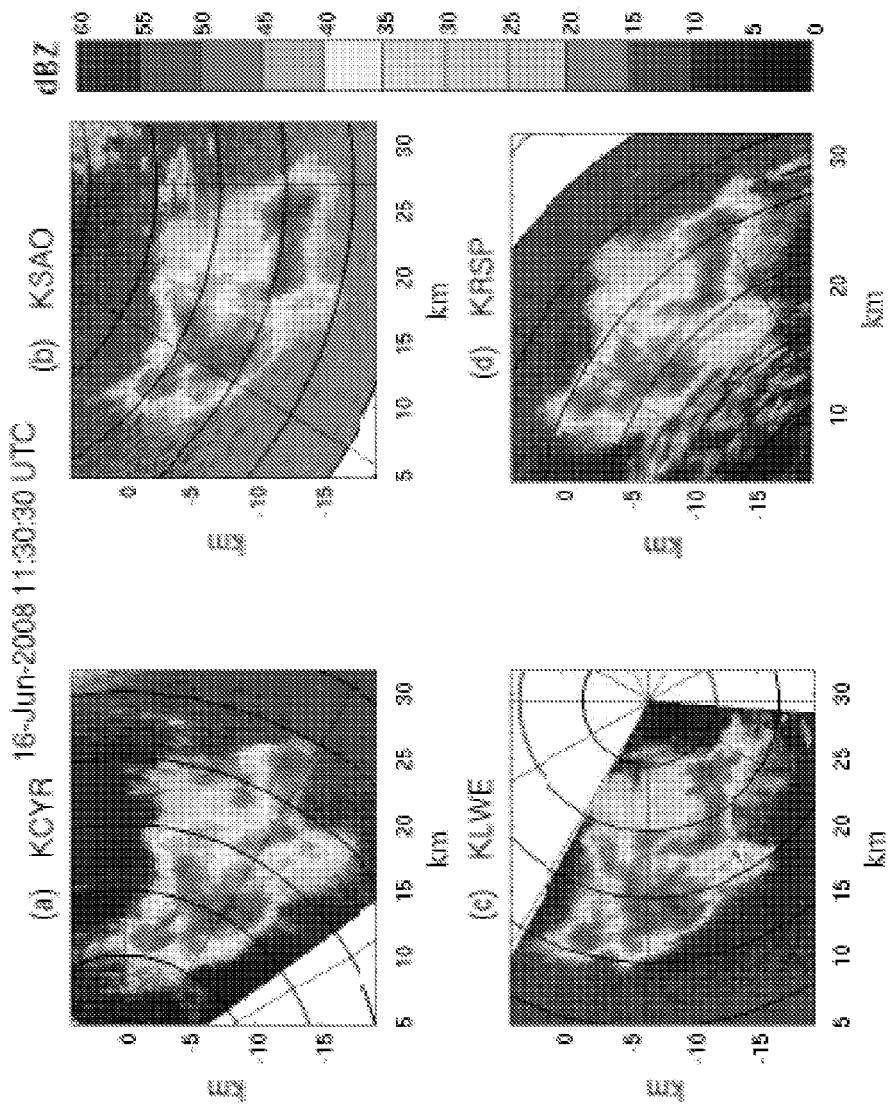
FIGS. 24(a)-(d) illustrate data collected with the IP1 radar network on 2008 Jun. 16 at 11:30:30 UTC (a) KCYR, (b) KSAO, (c) KLWE, and (d) KRSP in accordance with various embodiments.
Figure 25:
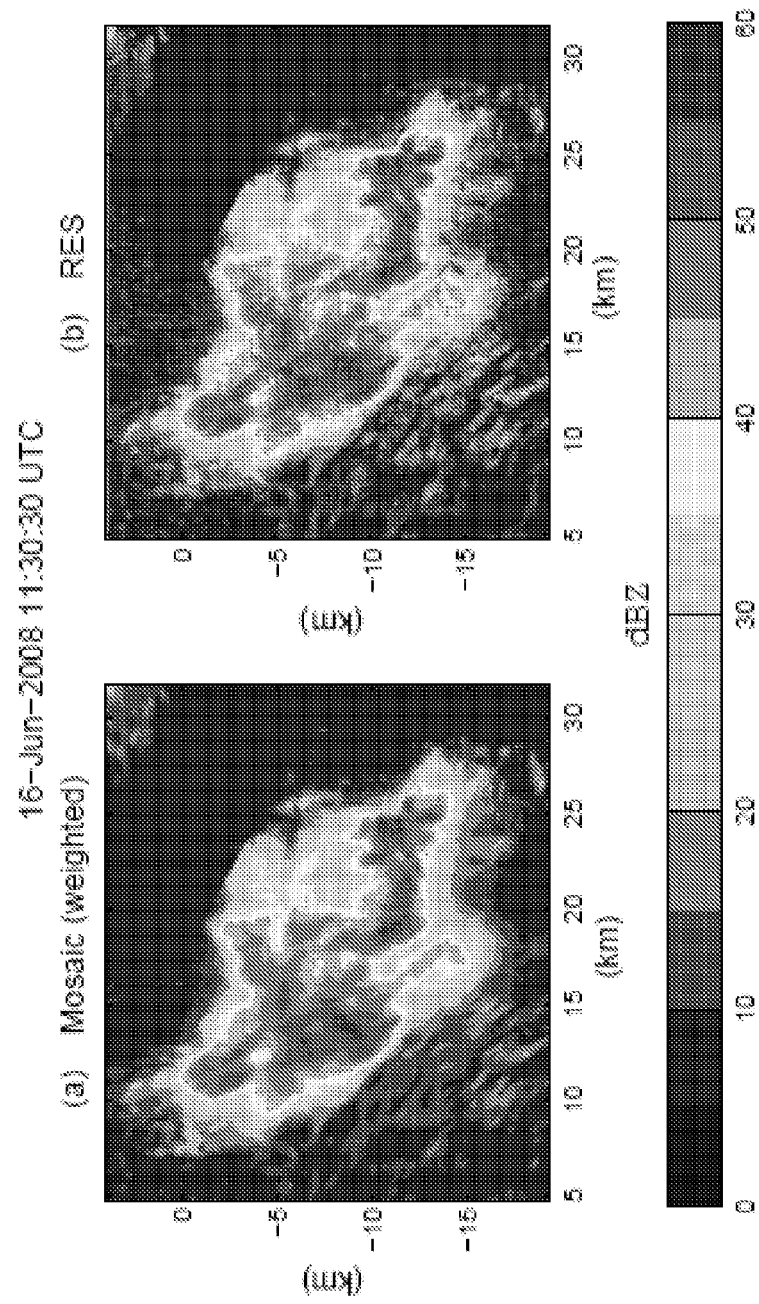
FIGS. 25(a)-(b) illustrate reflectivity retrieval from the IP1 radar network with data collected on 2008 Jun. 15 at 11:30:30

FIG. 23 shows the observations of reflectivity of an intense thunder storm in the IP I radar network. The thunder storm is observed by all the four nodes in the network as shown in FIG. 24. The data was collected at 1° elevation angle on Jun. 16, 2008 at 11:30 UTC. The comparison of the reflectivity mosaic and the resolution enhancement system is seen in FIG. 25-*a* and FIG. 25-*b*. Similar to the simulation results the peak reflectivity at the cores is much more[??] pronounced with the retrieval from resolution enhancement system. Also, there is more variability of features observed with the resolution enhancement system as compared to reflectivity mosaic.

Case III: Hook Echo

Figure 27:
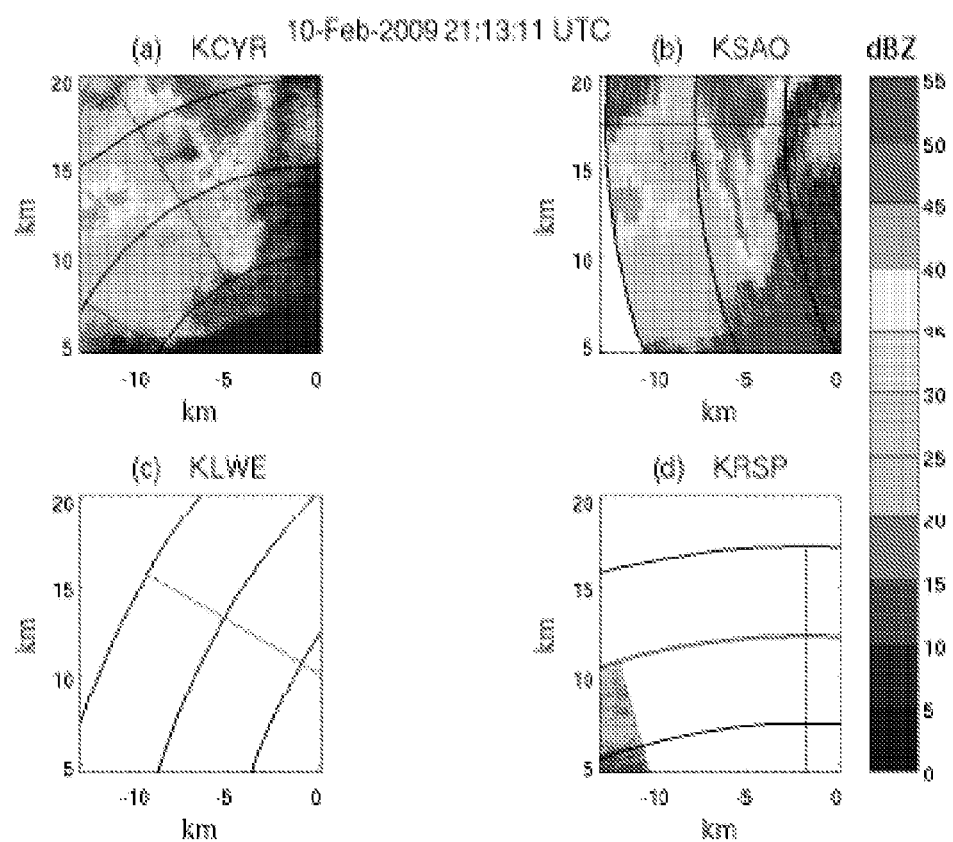
Figure 28:
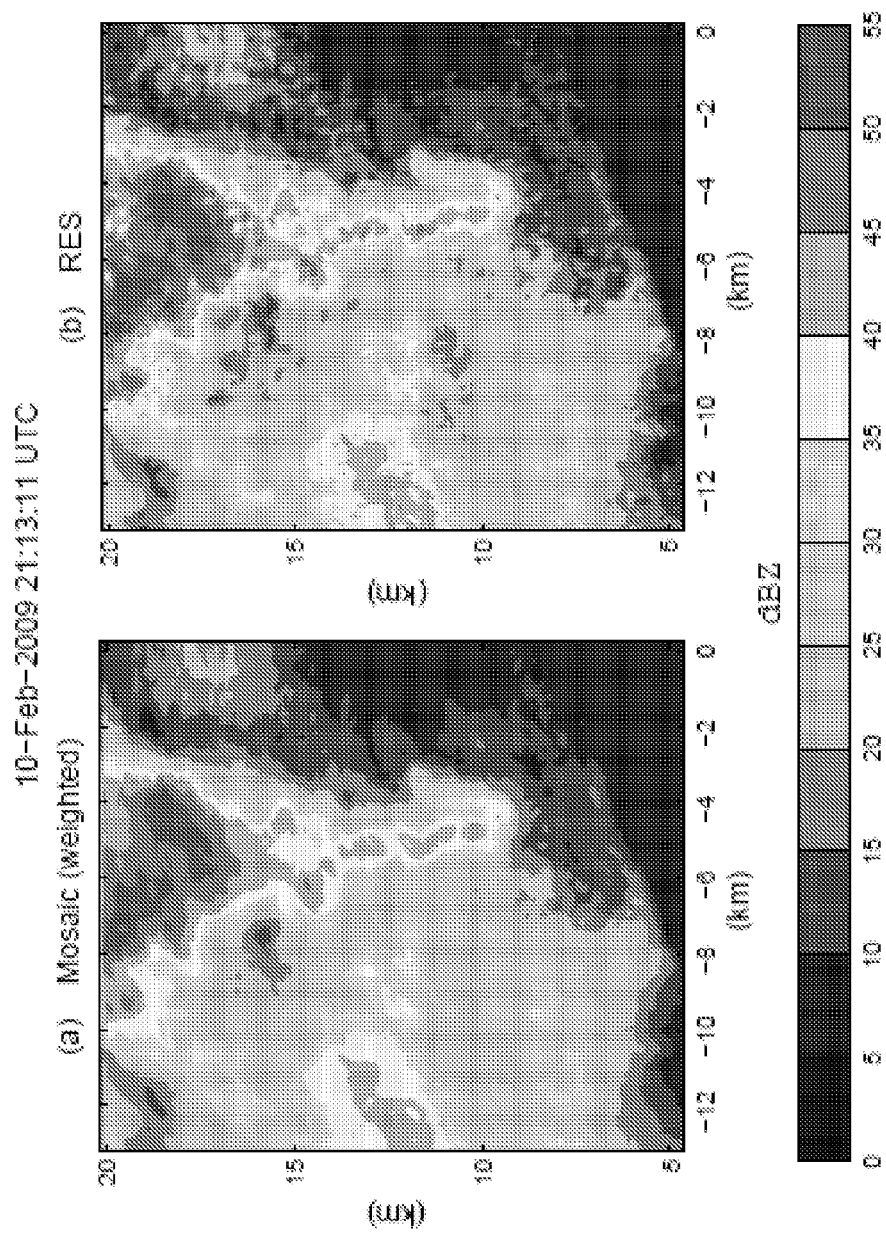

A hook echo associated with a tornado was observed by the IF1 radar network on Feb. 10, 2009 at 21:13 UTC. The position of the hook echo within the network is shown in FIG. 26 and its clearly out of range for Rush Springs and Lawton. The hook echo was observed by only two radars located at Cyril and Chickasha as shown in FIG. 27-*a* and FIG. 27-*b* respectively. The networked resolution enhancement system is applied to this data set. The reflectivity mosaic and networked retrieval is shown in FIG. 28-*a* and FIG. 28-*b* respectively. The formation of the hook echo is much more clearly visible in the networked retrieval. Also, as observed with previous data sets, the peak reflectivity observed in the core of the storm is much more prominent in the networked retrieval.

The RES retrieval is compared with National Weather Service (NWS) radar at Frederick, Okla. (KFDR), reflectivity mosaic from the current state of the art system, namely the Warning Decision Support System (WDSSII) and is shown in FIGS. 29-*a*, 29-*b*, and 29-*c*. A cursory inspection of the figures shows that the reflectivity mosaic from the WDSS II is definitely better than the WSR-88D (NEXRAD) observations, whereas the RES retrieval clearly displays more detailed features than the individual radars and the current reflectivity mosaic from WDSS II.

Multiscale Analysis Results

Scale analysis is performed on the range weighted reflectivity mosaic and RES retrieval by computing the isotropic power spectrum. The isotropic power spectrum of the reflectivity mosaic and RES retrieval for Case I, Case II, and Case II is shown in FIG. 30. As in the results for simulated data sets, and the power at scales larger than 1 km, there may be no significant difference between mosaic and RES reflectivity. The power spectrum for mosaic and RES may start to differ from each other for scales less than 1 km. Reflectivity from RES has consistently higher powers at lower scales than range weighted mosaic. The power difference between mosaic and RES may become more significant for scales smaller than 500 m.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of operating a radar network, the method comprising:
   generating respective radar beams with each of a plurality of radars disposed at different positions within an environment;
   determining a plurality of respective measured reflectivities of the environment along a respective path of each of the respective radar beams from the generated respective radar beams, wherein each respective measured reflectivity has a respective cross-azimuthal resolution; and
   determining a plurality of intrinsic reflectivities for a plurality of volume elements within the environment from the plurality of respective measured reflectivities along the respective path of each of the respective radar beams, wherein the respective intrinsic reflectivities for the respective volume elements each has a respective resolution greater than the respective cross-azimuthal resolutions of the measured reflectivities.

2. The method of claim 1, further comprising utilizing a spreading function for each of the plurality of radars to determine the intrinsic reflectivities for the plurality of volume elements.

3. The method of claim 2, wherein utilizing the spreading function for each of the plurality of radars to determine the intrinsic reflectivities for the plurality of volume elements utilizes a spreading function that is position variant.

4. The method of claim 2, wherein determining the intrinsic reflectivities further comprises solving a minimization problem described by $\min \|G_n z_{vec} - z_{gm}\|_2^2$, where $$G_n = \sum_{j=1}^{N} G_j^T G_j$$

represents a networked radar transformation matrix, $$z_{gm} = \sum_{j=1}^{N} G_j^T z_{m(j)}$$

represents a network transformed measured reflectivity, $G_j$ represents the spreading function for a jth radar, N equals the number of radars in the plurality of radars, and $z_m(j)=G(j)z_{vec}$ represents a vector of the plurality of measured reflectivities for the jth radar that correspond to $z_{vec}$ that represents a vectorized intrinsic reflectivity matrix.

5. The method of claim 1, wherein determining the plurality of respective measured reflectivities further comprises correcting for attenuation along at least a portion of the respective path of at least one of the respective radar beams.

6. The method of 1, further comprising utilizing a hexagonal grid for sampling the plurality of intrinsic reflectivities for the plurality of volume elements within the environment.

7. The method of 1, further comprising utilizing a Cartesian grid for sampling the plurality of intrinsic reflectivities for the plurality of volume elements within the environment.

8. The method of claim 1, wherein determining the plurality of intrinsic reflectivities for the plurality of volume elements further comprises dividing a common coverage area into a plurality of regions, wherein each region includes at least a subset of the plurality of volume elements, and processing each region in parallel to determine the plurality of intrinsic reflectivities.

9. The method of claim 1, wherein at least two of the respective radar beams have different frequencies.

10. The method of claim 1, wherein at least one of the respective radar beams has an X-band frequency.

11. A networked-radar evaluation system comprising:
    a communications device;
    a storage device;
    a processor in communication with the communications device and with the storage device; and
    a memory coupled with the processor, the memory comprising a computer-readable medium having a computer-readable program embodied therein for directing operation of the processing system to retrieve a plurality of intrinsic reflectivities from an environment, the computer-readable program comprising:
    instructions for receiving, with the communications device, a respective measured reflectivity of the environment along a respective path of each of a plurality of radar beams generated from respective ones of a plurality of radars disposed at different positions within the environment, wherein each respective measured reflectivity has a respective cross-azimuthal resolution; and
    instructions for determining, with the processor, the plurality of intrinsic reflectivities for different volume elements within the environment from the respective measured reflectivity along the respective path of each of the plurality of radar beam, wherein the respective intrinsic reflectivities for the respective volume elements each has a respective resolution greater than the respective cross-azimuthal resolutions of the measured reflectivities.

12. The networked-radar evaluation system of claim 11, wherein the instructions for determining the intrinsic reflectivities for the plurality of volume elements comprises instructions for utilizing a spreading function for each of the plurality of radars.

13. The networked-radar evaluation system of claim 12, wherein the instructions for utilizing the spreading function for each of the plurality of radars to determine the intrinsic reflectivities for the plurality of volume elements comprises utilizing a spreading function that is position variant.

14. The networked-radar evaluation system of claim 12, wherein the instructions for determining the intrinsic reflectivities comprise instructions for solving a minimization problem described by $\min\|G_n z_{vec} - z_{gm}\|_2^2$, $$\text{where } G_n = \sum_{j=1}^{N} G_j^T G_j$$

represents a networked radar transformation matrix, and $$z_{gm} = \sum_{j=1}^{N} G_j^T z_{m(j)}$$

represents a network transformed measured reflectivity, $G_j$ represents the spreading function for a jth radar, N equals the number of radars in the plurality of radars, $z_m(j) = G(j) z_{vec}$ represents a vector of the plurality of measured reflectivities for the jth radar that correspond to $z_{vec}$ that represents a vectorized intrinsic reflectivity matrix.

15. The networked-radar evaluation system of claim 11, wherein the instructions for determining the plurality of respective measured reflectivities further comprise instructions for correcting for attenuation along at least a portion of the respective path of at least one of the respective radar beams.

16. The networked-radar evaluation system of claim 11, further comprising instructions for utilizing a hexagonal grid for sampling the plurality of intrinsic reflectivities for the plurality of volume elements within the environment.

17. The networked-radar evaluation system of claim 11, further comprising instructions for utilizing a Cartesian grid for sampling the plurality of intrinsic reflectivities for the plurality of volume elements within the environment.

18. The networked-radar evaluation system of claim 11, wherein at least two of the respective radar beams have different frequencies.

19. The networked-radar evaluation system of claim 11, wherein at least one of the respective radar beams has an X-band frequency.

20. A radar network comprising:
a plurality of radars disposed at different positions within an environment; and
a computational unit interfaced with the plurality of radars, the computational unit having instructions to determine a plurality of intrinsic reflectivities for a plurality of volume elements within the environment from a plurality of respective measured reflectivities along a respective path of each of a plurality of respective radar beams, wherein each respective measured reflectivity has a respective cross-azimuthal resolution and the respective intrinsic reflectivities for the respective volume elements each has a respective resolution greater than the respective cross-azimuthal resolutions of the measured reflectivities.

21. The radar network of claim 20, wherein the computational unit further has instructions to utilize a spreading function for each of the plurality of radars to determine the intrinsic reflectivities for the plurality of volume elements.

22. The radar network of claim 21, wherein the instructions to utilize the spreading function for each of the plurality of radars to determine the intrinsic reflectivities for the plurality of volume elements utilizes a spreading function that is position variant.

23. The radar network of claim 21, wherein the computational unit further has instructions for determining the intrinsic reflectivities further comprising instructions to solve a minimization problem described by $\min\|G_n z_{vec} - z_{gm}\|_2^2$, $$\text{where } G_n = \sum_{j=1}^{N} G_j^T G_j$$

represents a networked radar transformation matrix, $$z_{gm} = \sum_{j=1}^{N} G_j^T z_{m(j)}$$

represents a network transformed measured reflectivity, $G_j$ represents the spreading function for a jth radar, N equals the number of radars in the plurality of radars, $z_m(j) = G(j) z_{vec}$ represents a vector of the plurality of measured reflectivities for the jth radar that correspond to $z_{vec}$ that represents a vectorized intrinsic reflectivity matrix.

24. The radar network of claim 20, wherein the instructions to determine the plurality of respective measured reflectivities further comprise instructions to correct for attenuation along at least a portion of the respective path of at least one of the respective radar beams.

25. The radar network of claim 20, wherein the computational unit further has instructions to utilize a hexagonal grid for sampling the plurality of intrinsic reflectivities for the plurality of volume elements within the environment.

26. The radar network of claim 20, wherein the computational unit further has instructions to utilize a Cartesian grid for sampling the plurality of intrinsic reflectivities for the plurality of volume elements within the environment.

27. The radar network of claim 20, wherein at least two of the respective radar beams have different frequencies.

28. The radar network of claim 20, wherein at least one of the respective radar beams has an X-band frequency.

* * * * *